US008565749B2

(12) United States Patent
Satake

(10) Patent No.: US 8,565,749 B2
(45) Date of Patent: Oct. 22, 2013

(54) MOBILE PHONE TERMINAL, SERVER, AND GROUP CALL SYSTEM

(75) Inventor: Masaomi Satake, Yokohama (JP)

(73) Assignee: Kyocera Corporation, Kyoto (JP)

( * ) Notice: Subject to any disclaimer, the term of this patent is extended or adjusted under 35 U.S.C. 154(b) by 769 days.

(21) Appl. No.: 12/298,718

(22) PCT Filed: Apr. 26, 2007

(86) PCT No.: PCT/JP2007/059124
§ 371 (c)(1),
(2), (4) Date: Apr. 14, 2009

(87) PCT Pub. No.: WO2007/126029
PCT Pub. Date: Nov. 8, 2007

(65) Prior Publication Data
US 2010/0016007 A1  Jan. 21, 2010

(30) Foreign Application Priority Data

Apr. 27, 2006 (JP) ................................. 2006-124525
Apr. 27, 2006 (JP) ................................. 2006-124526
Apr. 27, 2006 (JP) ................................. 2006-124528
Apr. 27, 2006 (JP) ................................. 2006-124529

(51) Int. Cl.
*H04W 4/00* (2009.01)

(52) U.S. Cl.
USPC ..................... 455/422.1; 455/518; 455/519

(58) Field of Classification Search
USPC ............................................... 455/518, 422.1
See application file for complete search history.

(56) References Cited

U.S. PATENT DOCUMENTS

| 5,440,299 | A | * | 8/1995 | Schwendeman | 455/527 |
| 5,666,364 | A | * | 9/1997 | Pierce et al. | 370/455 |
| 5,748,723 | A | * | 5/1998 | Hanai et al. | 379/265.02 |
| 5,838,770 | A | * | 11/1998 | Fukushima et al. | 379/32.03 |
| 5,881,061 | A | * | 3/1999 | Iizuka et al. | 370/337 |
| 5,940,759 | A | * | 8/1999 | Lopez-Torres et al. | 455/433 |
| 5,974,224 | A | * | 10/1999 | Nagata | 386/329 |

(Continued)

FOREIGN PATENT DOCUMENTS

CN 1643950 A 7/2005
JP 2005-535156 A 11/2005

(Continued)

OTHER PUBLICATIONS

Japanese language office action dated Feb. 8, 2011 and its English language translation for corresponding Japanese application 2006124525.

(Continued)

*Primary Examiner* — Hai V Nguyen
(74) *Attorney, Agent, or Firm* — DLA Piper LLP (US)

(57) ABSTRACT

A mobile station 10 includes: an SMS information acquisition unit 21 configured to acquire an SMS (registration request) through line switching NW 300, the SMS including group call identification information that identifies a group call; a memory 19 configured to store the group call identification information included in the SMS (registration request) as a received call history; and a halfway participation processor 25b configured to accept calling operation for the group call associated with the group call identification information stored as the received call history, to acquire from the storage unit the group call identification information associated with the group call for which the calling operation has been accepted, and to generate an INVITE (halfway participation) including the acquired group call identification information.

16 Claims, 16 Drawing Sheets

(56) References Cited

U.S. PATENT DOCUMENTS

| | | | |
|---|---|---|---|
| 5,995,240 A * | 11/1999 | Sato | 358/407 |
| 6,385,461 B1 * | 5/2002 | Raith | 455/518 |
| 6,434,126 B1 * | 8/2002 | Park | 370/328 |
| 6,539,237 B1 * | 3/2003 | Sayers et al. | 455/555 |
| 6,754,322 B1 * | 6/2004 | Bushnell | 379/202.01 |
| 6,757,266 B1 * | 6/2004 | Hundscheidt | 370/328 |
| 6,803,810 B2 * | 10/2004 | Yamada et al. | 327/544 |
| 6,826,403 B1 * | 11/2004 | Minborg et al. | 455/445 |
| 6,873,854 B2 * | 3/2005 | Crockett et al. | 455/518 |
| 6,922,721 B1 * | 7/2005 | Minborg et al. | 709/219 |
| 6,963,558 B2 * | 11/2005 | Sylvain | 370/352 |
| 7,139,381 B2 * | 11/2006 | McCormack | 379/207.02 |
| 7,254,237 B2 * | 8/2007 | Civanlar et al. | 370/401 |
| 7,257,416 B2 * | 8/2007 | Lee et al. | 455/456.2 |
| 7,317,919 B1 * | 1/2008 | Ruf | 455/446 |
| 7,319,745 B1 * | 1/2008 | Firestone | 379/202.01 |
| 7,356,577 B2 * | 4/2008 | Collins | 709/221 |
| 7,406,059 B2 * | 7/2008 | Jung | 370/328 |
| 7,437,170 B2 * | 10/2008 | Dunn et al. | 455/518 |
| 7,451,921 B2 * | 11/2008 | Dowling et al. | 235/380 |
| 7,466,810 B1 * | 12/2008 | Quon et al. | 379/201.01 |
| 7,489,273 B2 * | 2/2009 | Pitt et al. | 342/357.42 |
| 7,505,578 B2 * | 3/2009 | Mannion et al. | 379/265.12 |
| 7,512,692 B2 * | 3/2009 | Minborg et al. | 709/227 |
| 7,522,608 B2 * | 4/2009 | Samdadiya et al. | 370/395.21 |
| 7,526,306 B2 * | 4/2009 | Brems et al. | 455/518 |
| 7,567,804 B1 * | 7/2009 | Mangal | 455/435.1 |
| 7,577,431 B2 * | 8/2009 | Jiang | 455/432.1 |
| 7,593,743 B2 * | 9/2009 | East | 455/519 |
| 7,620,393 B2 * | 11/2009 | Venkitaraman et al. | 455/426.1 |
| 7,626,951 B2 * | 12/2009 | Croy et al. | 370/261 |
| 7,653,405 B2 * | 1/2010 | Wu et al. | 455/519 |
| 7,711,119 B2 | 5/2010 | Brett et al. | |
| 7,715,422 B2 * | 5/2010 | Hasegawa | 370/432 |
| 7,747,265 B1 * | 6/2010 | Ruf | 455/466 |
| 7,756,540 B2 * | 7/2010 | Tillet et al. | 455/518 |
| 7,761,110 B2 * | 7/2010 | Chotai et al. | 455/519 |
| 7,773,735 B2 * | 8/2010 | Rudolph | 379/114.2 |
| 7,787,872 B2 * | 8/2010 | Minborg et al. | 455/415 |
| 7,787,896 B2 * | 8/2010 | Kundu et al. | 455/518 |
| 7,801,953 B1 * | 9/2010 | Denman et al. | 709/204 |
| 7,804,944 B2 * | 9/2010 | Pines et al. | 379/114.01 |
| 7,805,382 B2 * | 9/2010 | Rosen et al. | 705/321 |
| 7,813,748 B2 * | 10/2010 | Suzuki et al. | 455/518 |
| 7,869,386 B2 * | 1/2011 | Shaffer et al. | 370/260 |
| 7,885,199 B2 * | 2/2011 | Mooney et al. | 370/252 |
| 7,885,208 B2 * | 2/2011 | Mutikainen et al. | 370/260 |
| 7,924,996 B2 * | 4/2011 | Appelman et al. | 379/207.16 |
| 7,966,031 B2 * | 6/2011 | Sung et al. | 455/519 |
| 7,983,242 B2 * | 7/2011 | Nasielski et al. | 370/352 |
| 8,028,073 B2 * | 9/2011 | Maes et al. | 709/227 |
| 8,037,192 B2 * | 10/2011 | Minborg et al. | 709/227 |
| 8,085,923 B2 * | 12/2011 | Pines et al. | 379/218.01 |
| 8,107,948 B2 * | 1/2012 | Nishigai | 455/422.1 |
| 8,112,117 B2 * | 2/2012 | Jheng et al. | 455/558 |
| 8,169,951 B1 * | 5/2012 | Mangal | 370/328 |
| 8,204,446 B2 * | 6/2012 | Scheer et al. | 455/67.11 |
| 8,265,242 B2 * | 9/2012 | Pines et al. | 379/114.01 |
| 8,358,767 B2 * | 1/2013 | Pines et al. | 379/218.01 |
| 2003/0130864 A1 * | 7/2003 | Ho et al. | 705/1 |
| 2003/0153339 A1 * | 8/2003 | Crockett et al. | 455/518 |
| 2003/0153340 A1 * | 8/2003 | Crockett et al. | 455/518 |
| 2003/0154249 A1 * | 8/2003 | Crockett et al. | 709/204 |
| 2003/0174684 A1 * | 9/2003 | Pohjanvuori et al. | 370/338 |
| 2003/0235288 A1 * | 12/2003 | McCormack | 379/265.02 |
| 2004/0043773 A1 * | 3/2004 | Lee et al. | 455/456.1 |
| 2004/0249949 A1 * | 12/2004 | Gourraud et al. | 709/227 |
| 2005/0034150 A1 * | 2/2005 | Muraoka | 725/31 |
| 2005/0041640 A1 * | 2/2005 | Nasielski et al. | 370/352 |
| 2005/0058125 A1 * | 3/2005 | Mutikainen et al. | 370/354 |
| 2005/0078612 A1 * | 4/2005 | Lang | 370/260 |
| 2005/0122922 A1 * | 6/2005 | Wu et al. | 370/310 |
| 2005/0131837 A1 * | 6/2005 | Sanctis et al. | 705/64 |
| 2005/0227677 A1 * | 10/2005 | Kallio | 455/414.3 |
| 2005/0239485 A1 * | 10/2005 | Kundu et al. | 455/519 |
| 2005/0249153 A1 * | 11/2005 | Park et al. | 370/328 |
| 2005/0271041 A1 * | 12/2005 | Minborg et al. | 370/352 |
| 2005/0277431 A1 * | 12/2005 | White | 455/466 |
| 2006/0031368 A1 * | 2/2006 | deCone | 709/207 |
| 2006/0047678 A1 * | 3/2006 | Miyazaki et al. | 707/102 |
| 2006/0073816 A1 * | 4/2006 | Kim et al. | 455/414.1 |
| 2006/0111135 A1 * | 5/2006 | Gray et al. | 455/519 |
| 2006/0172734 A1 * | 8/2006 | Tak | 455/433 |
| 2006/0229896 A1 * | 10/2006 | Rosen et al. | 705/1 |
| 2007/0030824 A1 * | 2/2007 | Ribaudo et al. | 370/328 |
| 2007/0049314 A1 * | 3/2007 | Balachandran et al. | 455/518 |
| 2007/0072587 A1 * | 3/2007 | Della-Torre | 455/410 |
| 2007/0097994 A1 * | 5/2007 | Samdadiya et al. | 370/401 |
| 2007/0100978 A1 * | 5/2007 | Levi et al. | 709/223 |
| 2007/0135146 A1 * | 6/2007 | Rezaiifar et al. | 455/466 |
| 2007/0208807 A1 * | 9/2007 | Jagannathan et al. | 709/204 |
| 2007/0259655 A1 * | 11/2007 | Minborg et al. | 455/415 |
| 2007/0280464 A1 * | 12/2007 | Hughes et al. | 379/205.01 |
| 2007/0300165 A1 * | 12/2007 | Haveliwala | 715/758 |
| 2008/0039104 A1 * | 2/2008 | Gu et al. | 455/445 |
| 2008/0049724 A1 * | 2/2008 | Tsujino et al. | 370/352 |
| 2008/0075256 A1 * | 3/2008 | Firestone | 379/202.01 |
| 2008/0275955 A1 * | 11/2008 | Yamazaki et al. | 709/205 |
| 2008/0305821 A1 * | 12/2008 | Sung et al. | 455/519 |
| 2008/0316998 A1 * | 12/2008 | Procopio et al. | 370/352 |
| 2009/0013045 A1 * | 1/2009 | Maes et al. | 709/205 |
| 2009/0093240 A1 * | 4/2009 | Lang | 455/416 |
| 2009/0109879 A1 * | 4/2009 | Kuusinen et al. | 370/260 |
| 2009/0129295 A1 * | 5/2009 | Shibata et al. | 370/260 |
| 2009/0143087 A1 * | 6/2009 | Minborg et al. | 455/466 |
| 2009/0149165 A1 * | 6/2009 | Minborg et al. | 455/414.2 |
| 2009/0157798 A1 * | 6/2009 | Laumen et al. | 709/203 |
| 2009/0168765 A1 * | 7/2009 | Samdadiya et al. | 370/352 |
| 2009/0215463 A1 * | 8/2009 | Satake | 455/445 |
| 2009/0234845 A1 * | 9/2009 | DeSantis et al. | 707/5 |
| 2009/0298444 A1 * | 12/2009 | Shigeta | 455/90.2 |
| 2009/0298477 A1 * | 12/2009 | Iio | 455/414.1 |
| 2009/0316607 A1 * | 12/2009 | Fukushima | 370/260 |
| 2010/0016007 A1 * | 1/2010 | Satake | 455/518 |
| 2011/0126270 A1 * | 5/2011 | Sato et al. | 726/4 |
| 2011/0143815 A1 * | 6/2011 | Inami | 455/566 |
| 2011/0235796 A1 * | 9/2011 | Radziewicz et al. | 379/207.16 |
| 2011/0305331 A1 * | 12/2011 | Hughes et al. | 379/202.01 |
| 2012/0020291 A1 * | 1/2012 | Nasielski et al. | 370/328 |
| 2012/0150577 A1 * | 6/2012 | Berg et al. | 705/7.12 |

FOREIGN PATENT DOCUMENTS

| | | |
|---|---|---|
| JP | 2006324925 A | 11/2006 |
| WO | 03/069928 A1 | 8/2003 |
| WO | 2005119963 A1 | 12/2005 |

OTHER PUBLICATIONS

Japanese language office action dated Feb. 8, 2011 and its English language translation for corresponding Japanese application 2006124526.

Japanese language office action dated Feb. 2011 and its English language translation for corresponding Japanese application 2006124529.

Japanese language office action dated May 10, 2011 and its English language translation for corresponding Japanese application 2006124525.

Chinese language office action dated Sep. 10, 2010 and its English language translation for corresponding Chinese application 200780015152.7.

Rosenberg, et al. SIP: Session Initiation Protocol; RFG 3261, Jun. 2002.

Korean language office action dated Jan. 3, 2011 and its English language translation for corresponding Korean application 1020087028127.

* cited by examiner

FIG. 4

| ORIGINATING MOBILE STATION | INITIAL SPECIFIED MOBILE STATION LIST | GROUP ID | INHIBIT FLAG |
|---|---|---|---|
| MOBILE STATION10a | MOBILE STATION10a, MOBILE STATION10b, MOBILE STATION10c, MOBILE STATION10d | No. 001 | 0(valid) |
| MOBILE STATION10x | MOBILE STATION10x, MOBILE STATION10y, MOBILE STATION10z, MOBILE STATION10d | No. 002 | 1(invalid) |
| MOBILE STATION10b | MOBILE STATION10a, MOBILE STATION10b, MOBILE STATION10c, MOBILE STATION10d | No. 003 | 0(valid) |
| ... | ... | ... | ... |

| GROUP ID | ORIGINATING MOBILE STATION | INITIAL SPECIFIED MOBILE STATION LIST | PRESENT PARTICIPATING MEMBER | CALL STATE |
|---|---|---|---|---|
| No.001 | MOBILE STATION10a | MOBILE STATION10a, MOBILE STATION10b, MOBILE STATION10c, MOBILE STATION10d | MOBILE STATION10a, MOBILE STATION10b, MOBILE STATION10c | CALLING |
| No.002 | MOBILE STATION10x | MOBILE STATION10x, MOBILE STATION10y, MOBILE STATION10z, MOBILE STATION10d | — | END |
| ... | ... | ... | ... | ... |

(b)

| GROUP ID | ORIGINATING MOBILE STATION | INITIAL SPECIFIED MOBILE STATION LIST | PRESENT PARTICIPATING MEMBER | CALL STATE |
|---|---|---|---|---|
| No.001 | MOBILE STATION10a | MOBILE STATION10a, MOBILE STATION10b, MOBILE STATION10c, MOBILE STATION10d | MOBILE STATION10a, MOBILE STATION10e, MOBILE STATION10f | CALLING |
| No.002 | MOBILE STATION10x | MOBILE STATION10x, MOBILE STATION10y, MOBILE STATION10z, MOBILE STATION10d | — | END |
| No.003 | MOBILE STATION10b | MOBILE STATION10a, MOBILE STATION10b, MOBILE STATION10c, MOBILE STATION10d | MOBILE STATION10b, MOBILE STATION10c | CALLING |
| ... | ... | ... | ... | ... |

US 8,565,749 B2

MOBILE PHONE TERMINAL, SERVER, AND GROUP CALL SYSTEM

TECHNICAL FIELD

The present invention relates to a mobile phone terminal, a server, and a group call system that provide a group call in which a phone call among a plurality of mobile phone terminals is performed.

BACKGROUND ART

Conventionally, communication systems are known in which an originating mobile station and a plurality of mobile stations specified by the originating mobile station (hereinafter, referred to as specified mobile stations) form a group to perform a group call. The group call includes PTT (Push-To-Talk) in which authority to transmit a voice signal, i.e., authority for a user to speak (right to speak), is assigned only to one mobile station that participates in the group call.

Specifically, the group call is performed through a packet switching NW, and is performed by use of SIP (Session Initiation Protocol). The group call is started when each mobile station included in the group logs in to (registers in) an SIP server connected to the packet switching NW (for example, non-patent literature 1).

Thus, the group call cannot be started without a login of each mobile station to the SIP server. Therefore, when the originating mobile station attempts to start the group call, the specified mobile station needs to log in to the SIP server.

Accordingly, for the specified mobile station to log in to the SIP server, information that requests the login to the SIP server (SMS (Short Message Service) information) is transmitted to the specified mobile station through a line switching NW different from the packet switching NW.

Specifically, when receiving information (INVITE) that requests start of the group call from the originating mobile station, the SIP server transmits a request for transmitting the SMS information that requests a login to the SIP server, to an SMS server connected with the line switching NW. Subsequently, the SMS server transmits to each specified mobile station the SMS information that requests a login to the SIP server.

On the other hand, another group call is also known in which a mobile station that has not participated in a group call (hereinafter, referred to as non-participating mobile station) can be invited to participate in the group call halfway. The non-participating mobile station indicates a specified mobile station that does not respond a call from the originating mobile station although specified by the originating mobile station, or a mobile station not specified by the originating mobile station, and the like.

Specifically, in such a group call, the originating mobile station transmits, to the SIP server, information for inviting the non-participating mobile station to participate in the group call halfway. The SIP server transmits to the SMS server a request for transmitting the SMS information that requests a login to the SIP server. Subsequently, the SMS server transmits the SMS information that requests a login to the SIP server to the non-participating mobile station.

Non-patent literature 1: "SIP: Session Initiation Protocol," RFC3261

DISCLOSURE OF THE INVENTION

However, in the group call mentioned above, it has been difficult for the non-participating mobile station to participate in a desired group call halfway by oneself without an invitation from the originating mobile station.

Particularly, when a user does not notice a call from the originating mobile station, it is difficult for the user to participate in the desired group call halfway. Thus, such difficulties of halfway participation remarkably reduce convenience for the user.

Then, the present invention was made in order to solve the problem mentioned above. An object of the present invention is to provide a mobile phone terminal and a server that allow easy halfway participation in a desired group call without an invitation from a mobile station (mobile phone terminal) included in a group that is performing a group call.

Particularly, an object of the present invention is to provide a mobile phone terminal and a server that are capable of picking up a received call for a group call more securely.

Furthermore, an object of the present invention is to provide a mobile phone terminal and a server that allow halfway participation in the group call with a suitable application even when an application for executing the group call is changed during the group call.

One aspect of the present invention is summarized in that a mobile phone terminal connectable with a group call system that performs a group call in which a phone call among a plurality of mobile phone terminals is performed includes a receiver (SMS information acquisition unit 21) configured to receive an address registration request message through a line switching network, the address registration request message including group call identification information that identifies the group call and requesting address registration in a server provided in a packet switching network; a storage unit (memory 19) configured to store the group call identification information as a received call history, the group call identification information being included in the address registration request message received through the line switching network; and a transmitter (halfway participation processor 25b, SIP information input unit 26) configured to accept calling operation for the group call associated with the group call identification information stored as the received call history; to acquire from the storage unit the group call identification information associated with the group call for which the calling operation has been accepted; and to transmit halfway participation calling information including the acquired group call identification information.

According to this aspect, the mobile phone terminal transmits halfway participation calling information to the server, the halfway participation calling information including group identification information that identifies the group call.

Accordingly, the mobile phone terminal can identify a desired group call with the group identification information, and can easily participate in the desired group call halfway by oneself without invitation from a mobile phone terminal that participates in the desired group call.

Particularly, even when a user does not notice a call from an originating mobile station, the user can easily participate in the desired group call halfway, so that convenience for the user improves.

Moreover, the mobile phone terminal receives the group identification information through the line switching network. Thereby, the mobile phone terminal can acquire the group identification information more securely since the line switching network generally has a cover area wider than that of the packet switching network.

One aspect of the present invention is summarized in that in the aspect of the present invention mentioned above, the group call identification information is a list of terminal identification information that identifies a mobile phone terminal specified as a member of the group call by the mobile phone terminal of a calling source of the group call.

One aspect of the present invention is summarized in that in the aspect of the present invention mentioned above, the group call identification information is a list of a telephone number of the mobile phone terminal specified as the member of the group call by the calling source of the group call One aspect of the present invention is summarized in that the group call identification information is a group ID uniquely assigned to the group call by the server.

One aspect of the present invention is summarized in that a server provided in a packet switching network and configured to manage a group call in which a phone call among a plurality of mobile phone terminals is performed includes a new calling information receiver (SIP information reception unit 201) configured to receive new calling information that requests start of the group call; a management unit (group call processor 202, group call management DB 203) configured to manage the group call on the basis of group call identification information that identifies the group call associated with the new calling information received in the new calling information receiver; an instructing unit (SMS transmission request unit 204) configured to instruct to include the group call identification information in an address registration request message to be transmitted to a calling destination mobile phone terminal of the group call through a line switching network, the calling destination mobile phone terminal of the group call associated with the new calling information received in the new calling information receiver; a halfway participation calling information receiver configured to receive halfway participation calling information including the group call identification information; and a halfway participation processor (group call processor 202) configured to determine whether or not an on-going group call exists in a plurality of group calls managed in the management unit, the on-going group call associated with the group call identification information included in the halfway participation calling information received in the halfway participation calling information receiver, and to permit the mobile phone terminal that has transmitted the halfway participation calling information to participate in the on-going group call when the on-going group call associated with the group call identification information exists.

One aspect of the present invention is summarized in that in the aspect of the present invention mentioned above, the group call identification information is a list of terminal identification information that identifies a mobile phone terminal specified as a member of the group call by the mobile phone terminal of a calling source of the group call.

One aspect of the present invention is summarized in that in the aspect of the present invention mentioned above, the group call identification information is a list of a telephone number of the mobile phone terminal specified as the member of the group call by the calling source of the group call.

One aspect of the present invention is summarized in that in the aspect of the present invention mentioned above, the group call identification information is a group ID that uniquely identifies the group call.

One aspect of the present invention is summarized in that a mobile phone terminal connectable with a group call system that performs a group call in which a phone call among a plurality of mobile phone terminals is performed includes a receiver (SMS information acquisition unit 21) configured to receive new received call information that requests participation in the group call, the new received call information including the group ID that uniquely identifies the group call; a storage unit (memory 19) configured to store the group call as a received call history in association with the group ID included in the new received call information, the group call associated with the new received call information received in the receiver; a halfway participation calling information transmitter (halfway participation processor 25b, SIP information input unit 26) configured to accept calling operation for the group call stored as the received call history, to acquire from the storage unit the group ID associated with the group call for which the calling operation has been accepted, and to transmit halfway participation calling information including the acquired group ID; and a re-calling prohibition unit (received call history storage 23) configured to prohibit transmission of the halfway participation calling information associated with the group call after receiving a notice of a completion of the group call associated with the halfway participation calling information, when receiving the notice as a result of transmitting the halfway participation calling information.

According to this aspect, the mobile phone terminal transmits the halfway participation calling information to the server, the halfway participation calling information including the group ID that uniquely identifies the group call.

Accordingly, even when a plurality of group calls are started with the same initial specified mobile stations being specified, and are continuing, the mobile phone terminal can identify a desired group call with the group ID. That is, the mobile phone terminal can easily participate in the desired group call halfway by oneself without invitation from a mobile phone terminal that participates in the desired group call.

Particularly, even when a user does not notice a call from an originating mobile station, since the user can easily participate in the desired group call halfway, convenience for the user improves.

Moreover, when the mobile phone terminal receives the notice that the group call associated with the participation halfway calling information is completed, transmission of the halfway participation calling information associated with the group call is prohibited after receiving the notice.

Accordingly, transmission of the halfway participation calling information in spite of impossible halfway participation in the group call can be prevented, and effective use of network resource can be attained.

One aspect of the present invention is summarized in that in the aspect of the present invention mentioned above, the mobile phone terminal further includes a new calling information transmitter in which the storage unit stores a plurality of pieces of terminal identification information in association with the group ID, the pieces of terminal identification information respectively identifying a plurality of mobile phone terminals specified as a member of the group call stored as the received call history, and when the re-calling prohibition unit prohibits transmission of the halfway participation calling information, the new calling information transmitter transmits new calling information that requests start of a new group call, the new calling information including the plurality of pieces of terminal identification information stored in the storage unit in association with the group ID.

One aspect of the present invention is summarized in that in the aspect of the present invention mentioned above, the mobile phone terminal further includes a selector configured to select the terminal identification information from the plurality of pieces of terminal identification information stored in the storage unit in association with the group ID, in which the new calling information transmitter transmits the new calling information including the terminal identification information selected by the selector.

One aspect of the present invention is summarized in that in a group call system configured with a plurality of mobile phone terminals (mobile stations 10) and a server (SMS server 100 and SIP server 200) configured to manage a group call in which a phone call among the plurality of mobile phone terminals is performed, the server includes a new calling information receiver (SIP information receiver 201) configured to receive new calling information that requests start of the group call; a management unit (group call processor 202 and group call management DB 203) configured to assign a group ID that uniquely specifies the group call associated with the new calling information received in the new calling information receiver and to manage the group call on the basis of the group ID; and a transmitter (SMS transmission request unit 204 and SMS information transmission and reception unit 103) configured to transmit the group ID assigned to the group call and new received call information that requests participation in the group call, to the mobile phone terminal of a calling destination of the group call associated with the new calling information received in the new calling information receiver, the mobile phone terminal includes a storage unit (memory 19) configured to store the group call as a received call history in association with the group ID included in the new received call information, the group call associated with the new received call information received in the receiver; and a transmitter (halfway participation processor 25b, SIP information input unit 26) configured to accept calling operation for the group call stored as the received call history; to acquire from the storage unit the group ID associated with the group call for which the calling operation has been accepted; and to transmit halfway participation calling information including the acquired group ID to the server, and the server further includes a halfway participation processor (group call processor 202) configured to determine whether or not an on-going group call associated with the group ID included in the halfway participation calling information received from the mobile phone terminal exists in the plurality of group calls managed in the management unit, and to permit the mobile phone terminal that has transmitted the halfway participation calling information to participate in the group call when the on-going group call associated with the group ID exists.

According to this aspect, the server manages the group call with the group ID that uniquely identifies the group call, and the mobile phone terminal transmits the halfway participation calling information including the group ID to the server.

Accordingly, even when a plurality of group calls are started with the same initial specified mobile stations being specified, and are continuing, the mobile phone terminal can identify a desired group call with the group ID. That is, the mobile phone terminal can easily participate in the desired group call halfway by oneself without invitation from a mobile phone terminal that participates in the desired group call.

Particularly, even when a user does not notice a call from an originating mobile station, since the user can easily participate in the desired group call halfway, convenience for the user improves.

One aspect of the present invention is summarized in that a mobile phone terminal connectable with a group call system that performs a group call in which a phone call among a plurality of mobile phone terminals is performed includes a receiver (SMS information acquisition unit 21) configured to receive new received call information that requests participation in the group call, the new received call information including the group ID that uniquely identifies the group call; a storage unit (memory 19) configured to store the group call as a received call history in association with the group ID included in the new received call information, the group call associated with the new received call information received from the server; and a transmitter (halfway participation processor 25b, SIP information input unit 26) configured to accept calling operation for the group call stored as the received call history; to acquire from the storage unit the group ID associated with the group call for which the calling operation has been accepted; and to transmit halfway participation calling information including the acquired group ID.

One aspect of the present invention is summarized in that a server configured to manage a group call in which a phone call among a plurality of mobile phone terminals is performed includes a new calling information receiver (SIP information receiver 201) configured to receive new calling information that requests start of the group call; a management unit (group call processor 202 and group call management DB 203) configured to assign the group ID that uniquely identifies the group call associated with the new calling information received in the new calling information receiver, and to manage the group call on the basis of the group ID; a transmitter (SIP information transmitter 206) configured to transmit the group ID assigned to the group call to the mobile phone terminal of a calling destination of the group call associated with the new calling information received in the new calling information receiver, in addition to new received call information that requests participation in the group call; a halfway participation calling information receiver (SIP information receiver 201) configured to receive halfway participation calling information including the group ID; and a halfway participation processor (group call processor 202) configured to determine whether or not an on-going group call associated with the group ID included in the halfway participation calling information received in the halfway participation calling information receiver exists in the plurality of group calls managed in the management unit, and to permit the mobile phone terminal that has transmitted the halfway participation calling information to participate in the on-going group call when the on-going group call associated with the group ID exists.

One aspect of the present invention is summarized in that a server configured to manage a group call in which a phone call among a plurality of mobile phone terminals is performed includes a new calling information receiver (SIP information receiver 201) configured to receive new calling information that requests start of the group call; a management unit (group call processor 202 and group call management DB 203) configured to manage whether or not a mobile phone terminal specified as a calling destination of the group call associated with the new calling information received in the new calling information receiver participates in the group call; and an informing unit (SMS transmission request unit 204, SMS information transmission and reception unit 103) configured to monitor an application that executes the group call and to inform a mobile phone terminal of change of the application when the application that executes the group call is changed, the mobile phone terminal being specified as the calling destination of the group call and not participating in the group call.

According to this aspect, the server informs the mobile phone terminal of change of the application, the mobile phone terminal being specified as the calling destination of the group call and not participating in the group call. Thereby, the mobile phone terminal can request halfway participation with a suitable application when requesting halfway participation in the group call.

One aspect of the present invention is summarized in that a mobile phone terminal connectable with a group call system that performs a group call in which a phone call among a plurality of to mobile phone terminals is performed includes a receiver (SMS information acquisition unit 21) configured to receive new received call information that requests participation in the group call, the new received call information including group identification information that identifies the group call; a storage unit (memory 19) configured to store the group call, associated with the new received call information received in the receiver, as a received call history, in association with the group identification information included in the new received call information and with application identification information that identifies an application that executes the group call; a received call history updating unit (received call history storage 23) configured to update the application identification information stored as the received call history on the basis of a notice of change of an application when receiving the notice of change of the application that executes the group call; and a transmitter (halfway participation processor 25b, SIP information input unit 26) configured to accept calling operation for the group call stored as the received call history; to acquire from the storage unit the application identification information and the group identification information associated with the group call for which the calling operation has been accepted; and to transmit halfway participation calling information that includes the acquired group identification information and requests halfway participation in the group call with the application associated with the acquired application identification information.

According to this aspect, the mobile phone terminal requests halfway participation in the group call with the application associated with the application identification information stored as the received call history. Thereby, easy halfway participation in the group call is allowed, without halfway participation being prevented by a difference in the application.

According to the present invention, a group call system, a mobile phone terminal, and a server can be provided with the provision in which easy halfway participation in a desired group call is allowed without invitation from a mobile phone terminal included in a group that is performing the group call.

BRIEF DESCRIPTION OF THE DRAWINGS

FIG. 4 is a diagram showing an example of a received call history stored in a memory 19 according to the first embodiment of the present invention.

FIG. 6 is a diagram showing an example of management information stored in a group call management DB 203 according to the first embodiment of the present invention.

BEST MODE FOR CARRYING OUT THE INVENTION

First Embodiment (Configuration of Communication System)

Figure 1:
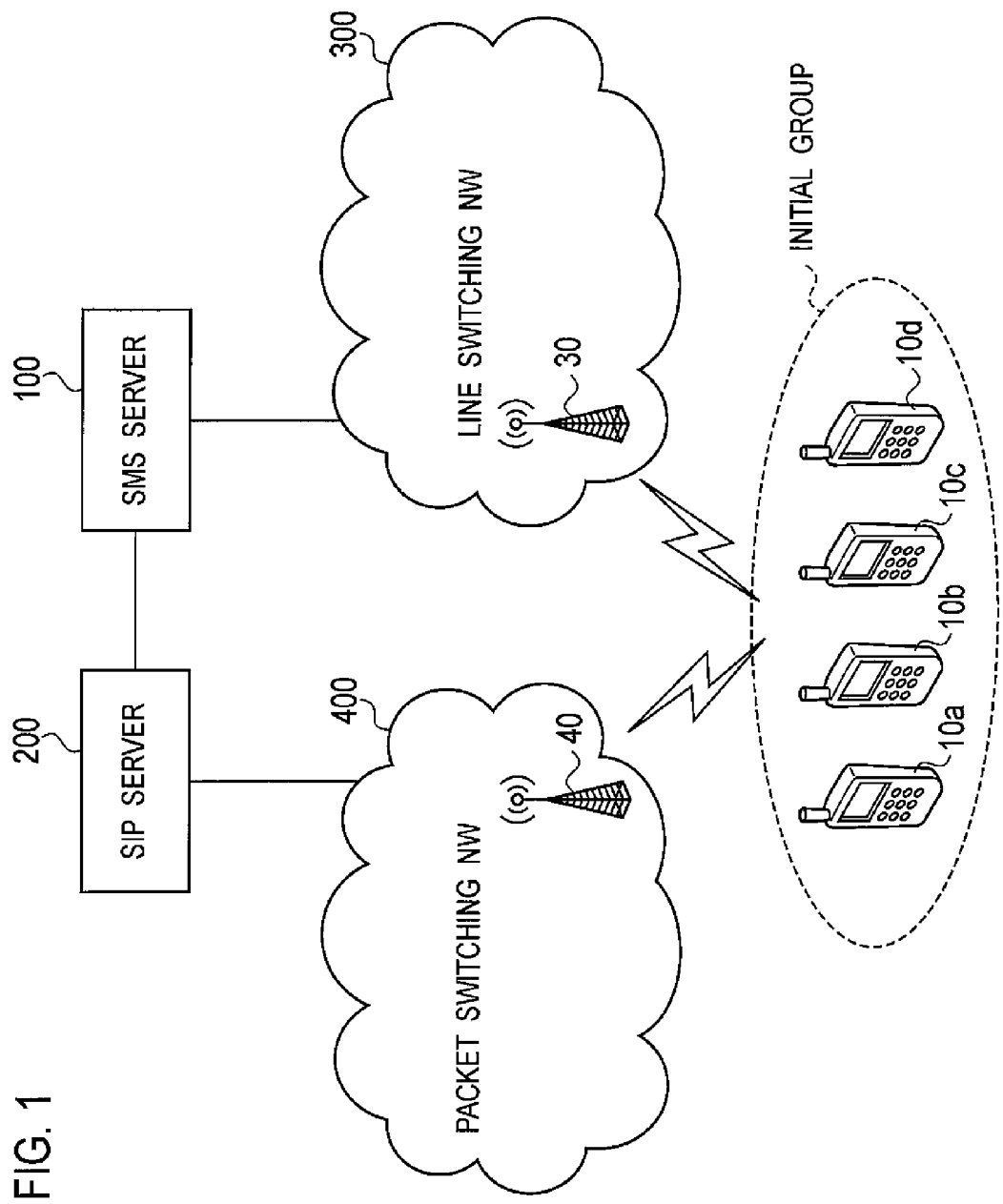
FIG. 1 is a diagram showing a configuration of a communication system according to a first embodiment of the present invention.

Hereinafter, a communication system according to a first embodiment of the present invention will be described with reference to the drawings. FIG. 1 is a drawing showing a configuration of the communication system according to the first embodiment of the present invention.

As shown in FIG. 1, the communication system has a line switching NW 300 including a base station 30, a packet switching NW 400 including a base station 40, an SMS server 100 connected to the line switching NW 300, and an SIP server 200 connected to the packet switching NW 400. The SMS server 100 is connected to the SIP server 200.

The base station 30 and the base station 40 are different base stations in description of the first embodiment, but not limited to this. Specifically, one base station included in both the line switching NW 300 and the packet switching NW 400 may have both functions that the base station 30 and the base station 40 have.

A plurality of mobile stations 10 (mobile station 10a to mobile station 10d) are mobile phone terminals connectable with the communication system. Specifically, each mobile station 10 can be connected with the base station 30 included in the line switching NW 300 and connected with the base station 40 included in the packet switching NW 400.

The line switching NW 300 is a network where communication is performed by line switching (for example, 1x network used in cdma2000), and a network where address registration of the mobile station 10 is unnecessary when the mobile station 10 communicates. On the other hand, the packet switching NW 400 is a network where communication is performed by packet switching (for example, EV-DO (Evolution Data Optimized) network used in cdma2000), and a network where address registration of the mobile station 10 is necessary when the mobile station 10 communicates.

In the packet switching NW 400, a group call is performed by forming a group as an initial group. The group includes one mobile station 10 (originating mobile station) and another mobile station 10 that responds a call from the originating mobile station among the other mobile stations 10 (specified mobile stations) specified by the one mobile station 10.

The first embodiment is described where the originating mobile station is the mobile station 10a and the specified mobile stations are the mobile station 10b to the mobile station 10d.

In the group call according to the first embodiment, the mobile station 10 participating in the group call can also invite another mobile station 10 not included in the specified mobile stations to participate in the group call.

Here, the group call includes the PTT (Push-To-Talk) that allows transmission and reception of only voice signals and the IP-TV that allows transmission and reception of voice signals and image signals.

(Configuration of Mobile Station)

Figure 2:
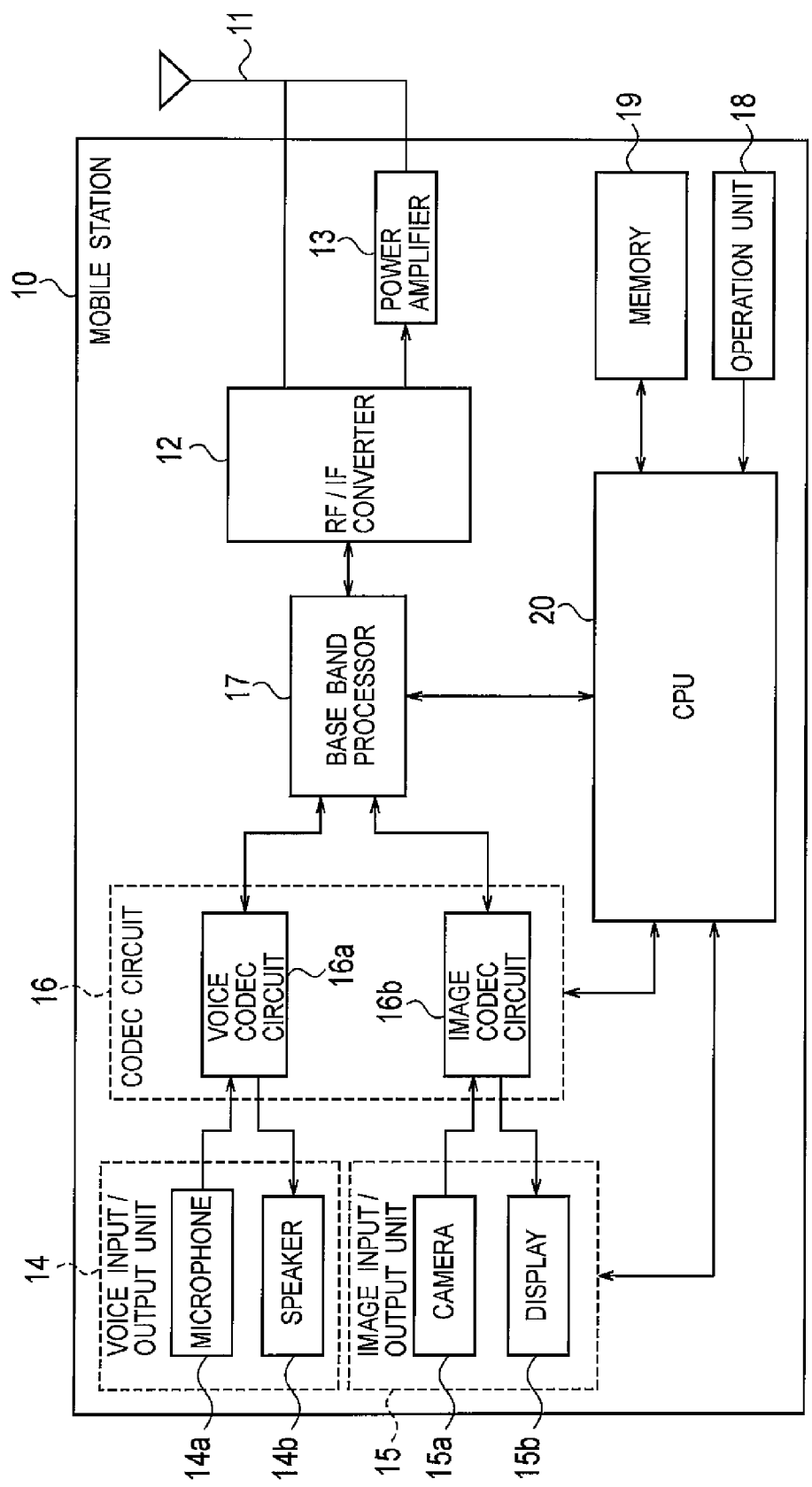
FIG. 2 is a block diagram showing a configuration of a mobile station 10 according to the first embodiment of the present invention.

Hereinafter, a configuration of a mobile station according is to the first embodiment of the present invention will be described with reference to the drawings. FIG. 2 is a block diagram showing a configuration of the mobile station 10 according to the first embodiment of the present invention. Since the mobile station 10a to the mobile station 10d have a similar configuration to each other, hereinafter, these stations are referred to as the mobile station 10 and the description will be made.

As shown in FIG. 2, the mobile station 10 has an antenna 11, an RF/IF converter 12, a power amplifier 13, a voice input/output unit 14, an image input/output unit 15, a codec circuit 16, a base band processor 17, an operation unit 18, a memory 19, and a CPU 20.

The antenna 11 receives a signal (received signal) transmitted by the base station 30 included in the line switching NW 300, and a signal (received signal) transmitted by the base station 40 included in the packet switching NW 400. The antenna 11 transmits a signal (transmission signal) to the base station 30 included in the line switching NW 300 and to the base station 40 included in the packet switching NW 400.

The RF/IF converter 12 converts a frequency (Radio Frequency (RF)) of the received signal received by the antenna 11 into a frequency (Intermediate Frequency (IF)) treated by the base band processor 17. Moreover, the RF/IF converter 12 converts a frequency (Intermediate Frequency (IF)) of the transmission signal acquired from the base band processor 17 into a frequency (Radio Frequency (RF)) used in radio communications. The RF/IF converter 12 inputs the transmission signal converted into the Radio Frequency (RF) to the power amplifier 13.

The power amplifier 13 amplifies the transmission signal acquired from the RF/IF converter 12 to input the amplified transmission signal into the antenna 11.

The voice input/output unit 14 has a microphone 14a that collects a voice, and a speaker 14b that outputs the voice. The microphone 14a inputs a voice signal into the codec circuit 16 on the basis of the collected voice. The speaker 14b outputs the voice on the basis of the voice signal acquired from the codec circuit 16.

The image input/output unit 15 has a camera 15a that shoots a subject to be shot, and a display 15b that displays characters, images, etc. The camera 15a inputs an image signal into the codec circuit 16 on the basis of the shot image (static image and dynamic image). The display 15b displays the image on the basis of the image signal acquired from the codec circuit 16. The display 15b also displays characters, etc. inputted by use of the controller 18.

The codec circuit 16 has a voice codec circuit 16a that encodes and decodes the voice signal in accordance with a predetermined coding mode (for example, G.729 specified in the ITU-T). The codec circuit 16 has an image codec circuit 16b that encodes and decodes the image signal in accordance with a predetermined coding mode (for example, MPEG (Moving Picture coding Experts Group)-4, etc.)

The voice codec circuit 16a encodes the voice signal acquired from the voice input/output unit 14, and decodes the voice signal acquired from the base band processor 17. The image codec circuit 16b encodes the image signal acquired from the image input/output section 15, and decodes the image signal acquired from the base band processor 17.

The base band processor 17 modulates the transmission signal, or demodulates the received signal in accordance with a predetermined modulation technique such as (Binary Phase Shift Keying (BPSK) and Quadrature Phase Shift Keying (QPSK)), etc. Specifically, the base band processor 17 modulates base band signals such as the voice signal and the image signal acquired from the codec circuit 16 to input the modulated base band signals (transmission signals) into the RF/IF converter 12. The base band processor 17 demodulates the received signal acquired from the RF/IF converter 12 to input the demodulated received signal (base band signal) into the codec circuit 16.

The base band processor 17 modulates information (SMS information and SIP information) generated by the CPU 20 to input the modulated information (transmission signal) into the RF/IF converter 12. The base band processor 17 demodulates the received signal acquired from the RF/IF converter 12 to input the demodulated received signal (SMS information and SIP information) into the CPU 20.

The SMS information is the information transmitted and received through the line switching NW 300, and the SIP information is the information transmitted and received through the packet switching NW 400.

The operation unit 18 is a group of keys formed of input keys for inputting characters, numbers, etc.; a calling key for starting the group call; and an responding key for responding a received call (call), etc. When each key is pressed down, the operation unit 18 inputs an input signal associated with the pressed key into the CPU 20.

The memory 19 stores a program for controlling operation of the mobile station 10, and various data as a received call history, an address book, etc. The memory 19 is formed of, for example, a flash memory that is a nonvolatile semiconductor memory, or an SRAM (Static Random Access Memory) that is a volatile semiconductor memory.

Specifically, the memory 19 stores information shown as the received call history in FIG. 4. FIG. 4 is a drawing showing an example of the received call history stored in the memory 19 according to the first embodiment of the present invention.

As shown in FIG. 4, in the call register, an originating mobile station, an initial specified mobile station list, a group ID, and an inhibit flag are corresponded.

The originating mobile station is a mobile station 10 that requests start of a group call.

The initial specified mobile station list is formed of the originating mobile station and a specified mobile station specified by the originating mobile station. Apparently, while the participating member history column includes information of names of mobile stations 10 in FIG. 4, the information on the initial specified mobile station list column may be mobile station identification information that identifies each of the mobile stations 10 (for example, telephone number).

The group ID is an identifier that identifies the group call started by the initial group. Moreover, as described in full detail later, even when the mobile stations 10 that participate in the group call are changed, the group ID is not changed.

The inhibit flag is flag that shows whether or not the group ID is effective. Specifically, when the group ID is effective, the inhibit flag is set to "valid (0)." On the other hand, when the group ID is ineffective, the inhibit flag is set to "invalid (1)."

Additionally, it is possible to request halfway participation in the group call using the group ID when the group ID is effective, and a request of halfway participation in the group call using the group ID is prohibited when the group ID is ineffective.

The CPU 20 controls operation of the mobile station 10 (image input/output unit 15, codec circuit 16, base band processor 17, etc.) in accordance with the program stored in the memory 19.

Figure 3:
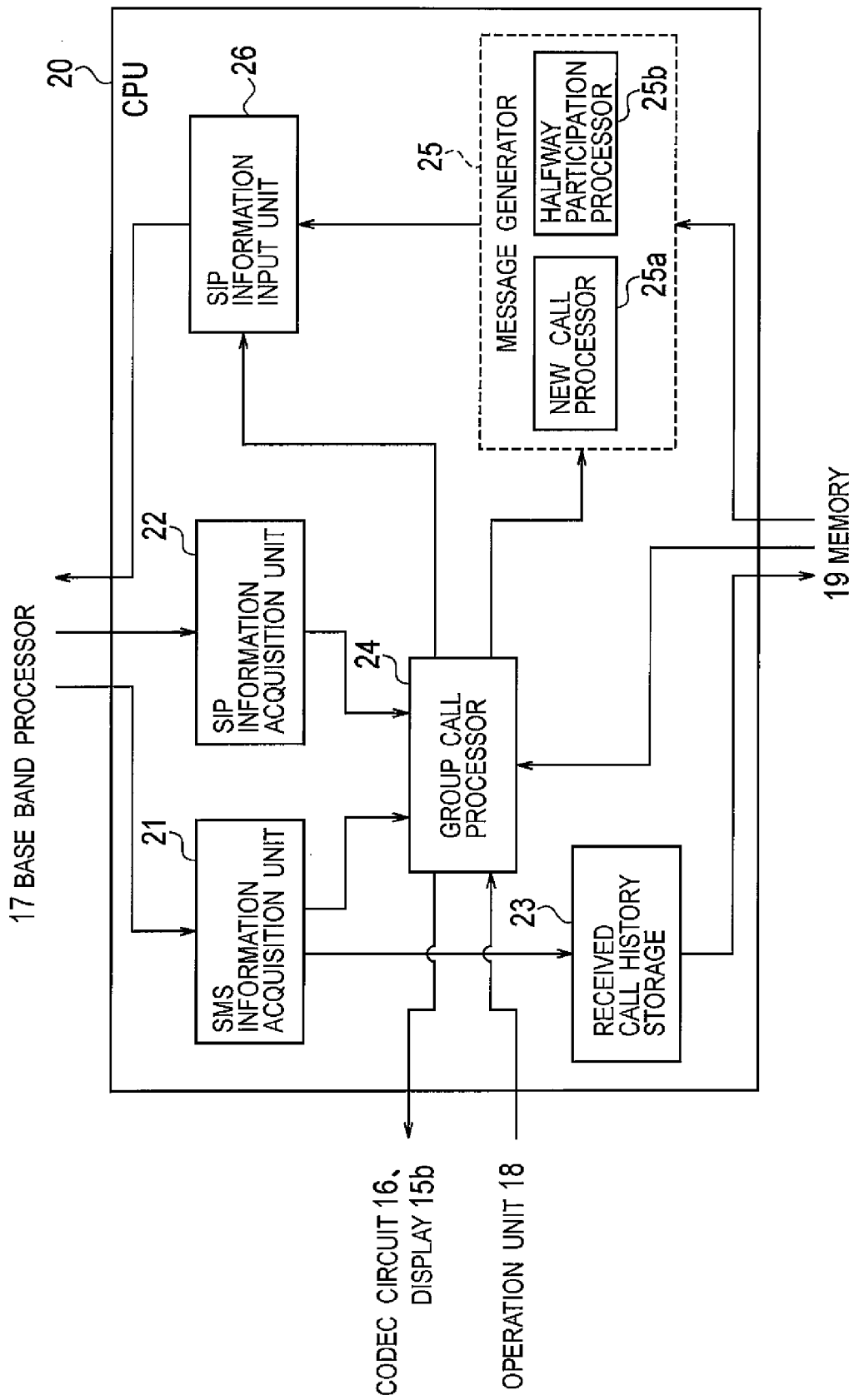
FIG. 3 is a block diagram showing a configuration of a CPU 20 according to the first embodiment of the present invention.

Hereinafter, a configuration of the CPU according to the first embodiment of the present invention will be described with reference to the drawing. FIG. 3 is a block diagram showing the configuration of the CPU 20 according to the first embodiment of the present invention.

As shown in FIG. 3, the CPU 20 has an SMS information acquisition unit 21, an SIP information acquisition unit 22, a received call history storage 23, a group call processor 24, a message generator 25, and an SIP information input unit 26.

The SMS information acquisition unit 21 acquires, from the base band processor 17, the SMS information received from the SMS server 100 through the line switching NW 300, and inputs the acquired SMS information into the group call processor 24.

Here, the SMS information is, for example, an address registration request (SMS (registration request)) that requests the mobile station 10 to register its address in the SIP server 200 connected to the packet switching NW 400.

Specifically, the address registration request (SMS (registration request)) includes mobile station identification information that identifies each of the mobile stations 10 (mobile station 10a to mobile station 10d in the first embodiment) included in the initial specified mobile station list. The address registration request (SMS (registration request)) also includes the group ID that identifies the group call started by the initial group. The group ID is generated by the SIP server 200 as described later.

Alternatively, as shown in a third embodiment described later, the SMS information may be an SMS (notice of application change) indicating that an application used in the group call is changed. Furthermore, as shown in a fourth embodiment described later, the SMS information may be an SMS (notice of participation prohibition) indicating that halfway participation in the group call is prohibited.

The SIP information acquisition unit 22 acquires, from the base band processor 17, the SIP information received from the SIP server 200 through the packet switching NW 400, and inputs the acquired SIP information into the group call processor 24.

Here, the SIP information is an INVITE (new) that requests other mobile station 10 to participate in the group call, an INVITE (halfway participation) that requests halfway participation in the group call, INFO (notice of participant) indicating participation of the mobile station 10 in a new group call, INFO (notice of updated participant) indicating update of the mobile stations 10 that participate in the group call, etc. Moreover, the SIP information is various messages (100Trying, 180Ringing, 200OK, ACK, BYE, etc.) used in the Session Initiation Protocol (SIP).

Alternatively, as shown in the third embodiment described later, the SIP information may be INFO (application change request) that requests change of an application used in the group call, or as shown in the fourth embodiment described later, the SIP information may be INFO (notice of participation prohibition) indicating the mobile station 10 that is prohibited from participating in the group call halfway.

The received call history storage 23 stores the received call history in the memory 19 in response to the address registration request (SMS (registration request)), etc. acquired from the SMS information acquisition unit 21. Specifically, the received call history storage 23 stores, in the memory 19, the mobile station identification information included in the address registration request (SMS (registration request)) as the received call history. Moreover, the received call history storage 23 stores, in the memory 19, the group ID included in the address registration request (SMS (registration request)) as the received call history.

Furthermore, the received call history storage 23 stores the inhibit flag indicating effectiveness of the group ID as the received call history in the memory 19. Specifically, the received call history storage 23 stores "0 (valid)," NT which shows that the group ID is effective, as an initial value of the inhibit flag. On the other hand, the received call history storage 23 updates the inhibit flag to "1 (invalid)" indicating that the group ID is ineffective, when an attempt to participate in the group call halfway using the group ID is made and the corresponding group call does not exist.

The group call processor 24 performs processing concerning the group call in accordance with the SIP. For example, in response to the input signal acquired from the controller 18, the group call processor 24 performs processing to start a new group call, processing to respond a call from other mobile station 10, processing to participate in the group call halfway, processing to end the group call, etc.

Additionally, in response to the address registration request (SMS (registration request)) acquired from the SMS information acquisition unit 21, the group call processor 24 performs processing (registration processing) to register the address in the SIP server 200.

Furthermore, in response to the SIP information acquired from the SIP information acquisition unit 22, the group call processor 24 generates the SIP information to input the generated SIP information into the SIP information input unit 26. When starting a new group call or participating in the group call halfway, the group call processor 24 inputs a generating request requesting generation of the SIP information into the message generator 25.

The message generator 25 has a new call processor 25a and a halfway participation processor 25b. The message generator 25 inputs the SIP information generated by the new call processor 25a and the halfway participation processor 25b into the SIP information input unit 26.

In response to the generating request acquired from the group call processor 24 when starting a new group call, the new call group processor 25a generates the SIP information, i.e., the INVITE (new) that requests other mobile stations 10 to participate in the group call. Specifically, the new call processor 25a reads from the memory 19 the mobile station identification information that identifies each specified mobile station 10 out of the address book stored in the memory 19, and generates the INVITE (new) including the read mobile station identification information. Apparently, the controller 18 may input the mobile station identification information.

On the other hand, in response to the generating request acquired from the group call processor 24 when halfway participation in the group call occurs, the participating processor 25b generates the SIP information, i.e., the INVITE (halfway participation) that requests halfway participation in the group call. Specifically, the participating processor 25b generates the INVITE (halfway participation) including the group ID specified by a user out of the received call history stored in the memory 19.

The SIP information input unit 26 inputs, into the base band processor 17, the SIP information acquired from the group call processor 24 and the message generator 25.

(Configuration of the Sip Server)

Figure 5:
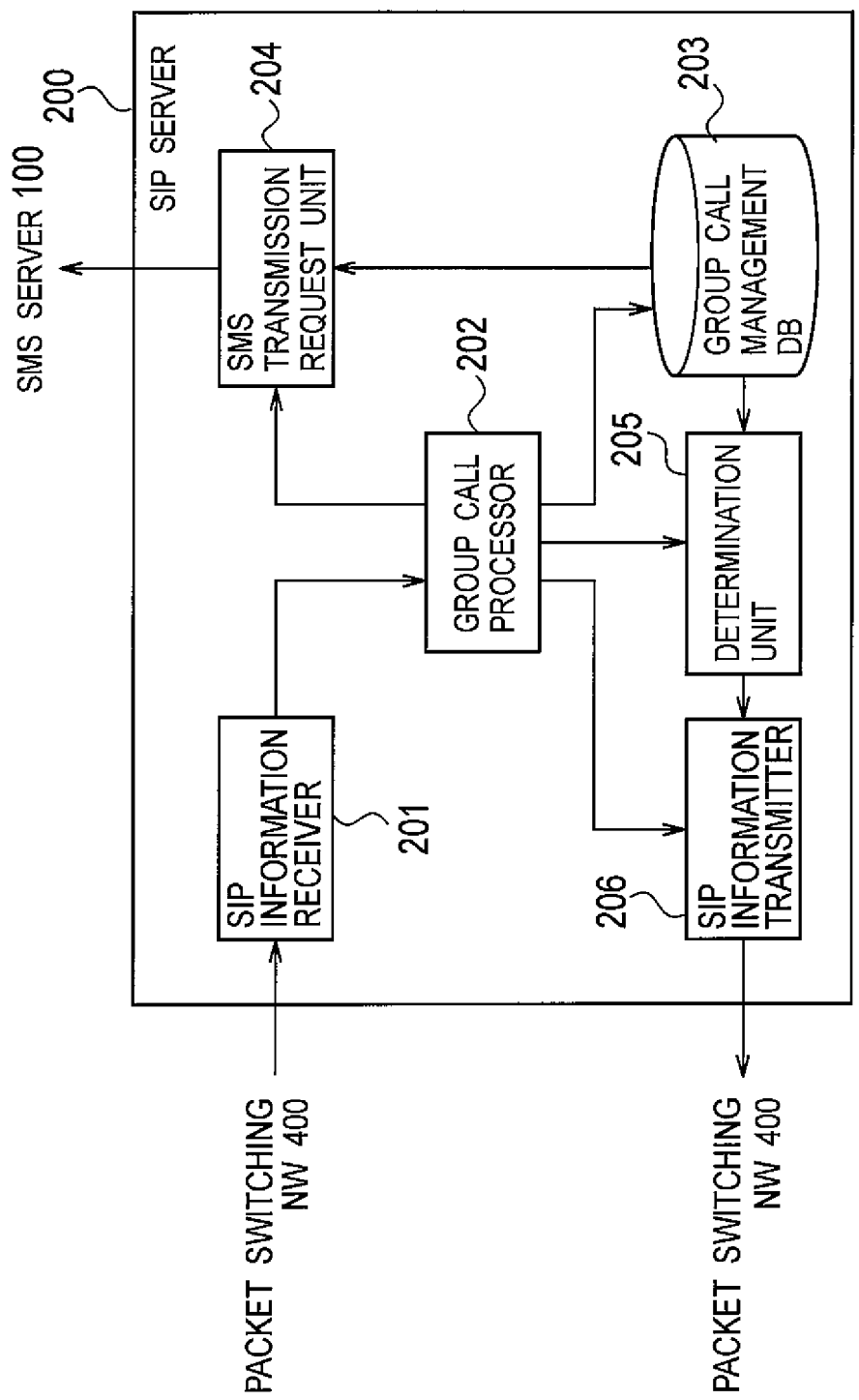
FIG. 5 is a block diagram showing a configuration of an SIP server 200 according to the first embodiment of the present invention.

Hereinafter, a configuration of the SIP server according to a first embodiment of the present invention will be described with reference to the drawing. FIG. 5 is a block diagram showing the configuration of the SIP server 200 according to the first embodiment of the present invention.

As shown in FIG. 5, the SIP server 200 has an SIP information receiver 201, a group call processor 202, a group call management DB 203, an SMS transmission requesting unit 204, a determination unit 205, and an SIP information transmitter 206.

The SIP information receiver 201 receives the SIP information from the mobile station 10 through the packet switching NW 400.

The group call processor 202 performs processing concerning the group call in accordance with the SIP.

For example, when the SIP information receiver 201 receives an INVITE (new), the group call processor 202 stores, in the group call management DB 203, the mobile station identification information that identifies each mobile station 10 included in the initial specified mobile station list. Subsequently, the group call processor 202 generates the group ID that identifies the group call started by the initial group, and stores the generated group ID in the group call management database 203.

When the SIP information receiver 201 receives the INVITE (new), the group call processor 202 generates an SMS transmission request that requests transmission of the SMS information that requests address registration in the SIP server 200, and inputs the generated SMS transmission request into the SMS transmission requesting unit 204. The SMS transmission request includes the group ID that identifies the group call started by the initial group, in addition to the identification information that identifies each mobile station 10 included in the initial specified mobile station list.

When the SIP information receiver 201 receives SIP information (200OK) indicating the mobile station 10's participation in the group call, the group call processor 202 updates the information stored in the group call management DB 203. Subsequently, the group call processor 202 generates SIP information (INFO (notice of participant)) indicating the mobile station 10 participating in the group call, and inputs the generated SIP information into the SIP information transmitter 206.

When the SIP information receiver 201 receives SIP information (200OK) indicating the mobile station 10's halfway participation in the group call, the group call processor 202 updates the information stored in the group call management DB 203. Subsequently, the group call processor 202 generates SIP information (INFO (notice of updated participant)) indicating update of the mobile stations 10 that participate in the group call, and inputs the generated SIP information into the SIP information transmitter 206.

When the SIP information receiver 201 receives SIP information (BYE) indicating a mobile station 10's withdrawal from the group call, the group call processor 202 updates the information stored in the group call management DB 203. Subsequently, the group call processor 202 generates SIP information (INFO (notice of updated participant)) indicating update of the mobile stations 10 that participate in the group call, and inputs the generated SIP information into the SIP information transmitter 206.

When the SIP information receiver 201 receives SIP information that requests to participate in the group call halfway, i.e., an INVITE (halfway participation), the group call processor 202 inputs the group ID included in the INVITE (halfway participation) into the determination unit 205.

The group call management DB 203 stores information shown in FIG. 6 as management information for managing the mobile station 10 that performs the group call. FIGS. 6(*a*) and 6(*b*) are drawings showing the management information stored in the group call management DB 203 according to the first embodiment of the present invention.

As shown in FIGS. 6(*a*) and 6(*b*), in the management information, the group ID, the originating mobile station, the initial specified mobile station list, the present participating members, and a call state are associated with each other.

The group ID is the identifier that identifies the group call started by the initial group, as mentioned above.

The originating mobile station is the mobile station 10 that requests start of the group call, as mentioned above.

The initial specified mobile station list is formed of the originating mobile station and the specified mobile station specified by the originating mobile station, as mentioned above.

The present participating members are the mobile stations 10 that participate in the group call. In the first embodiment, as mentioned above, the mobile station 10 that participates in the group call can invite another certain mobile station 10 not included in the initial specified mobile station list to participate in the group call. Accordingly, the certain mobile station 10 not included in the initial specified mobile station list may be included in the present participating members.

Specifically, as shown in FIG. 6(*a*), the present participating members of the group call having the group ID of No. 001 are the mobile station 10*a* to the mobile station 10*c*. On the other hand, as shown in FIG. 6(*b*), when the mobile stations 10 that participate in the group call change, the present participating members of the group call having the group ID of No. 001 may be the mobile station 10*a*, the mobile station 10*e*, and the mobile station 10*f*.

As shown in FIG. 6(*b*), the initial specified mobile station list of the group call having the group ID of No. 001 is the same so as the initial specified mobile station list of the group call having the group ID of No. 003. However, when the mobile stations 10 that participate in the group call (No. 001) change from those in the initial specified mobile station list, or when a new group call (No. 003) having the same initial specified mobile station list as the group call No. 001 is started while the present participating members are performing the group call, a plurality of group calls having the same initial specified mobile station list may simultaneously continue.

In the first embodiment of the present invention, even when the plurality of group calls having the same initial specified mobile station list simultaneously continue, each group call is uniquely established and managed with the group ID.

The SMS transmission requesting unit 204 transmits to the SMS server 100 the SMS transmission request acquired from the group call processor 202.

The determination unit 205 determines whether or not the mobile station 10 can participate halfway, the mobile station 10 having transmitted the SIP information that requests halfway participation in the group call, i.e., the INVITE (participation halfway).

Specifically, the determination unit 205 determines whether or not the group call identified by the group ID acquired from the group call processor 202 is continuing. The determination unit 205 determines that the mobile station 10 can participate halfway, when the group call identified by the group ID is continuing. The determination unit 205 determines that the mobile station 10 cannot participate halfway, when the group call identified by the group ID is completed.

The SIP information transmitter 206 transmits the SIP information acquired from the group call processor 202 (INVITE (new), INVITE (halfway participation), 100Trying, 180Ringing, 200OK, BYE, ACK, INFO, etc.) to the mobile station 10 through the packet switching NW 400.

(Configuration of SMS Server)

Figure 7:
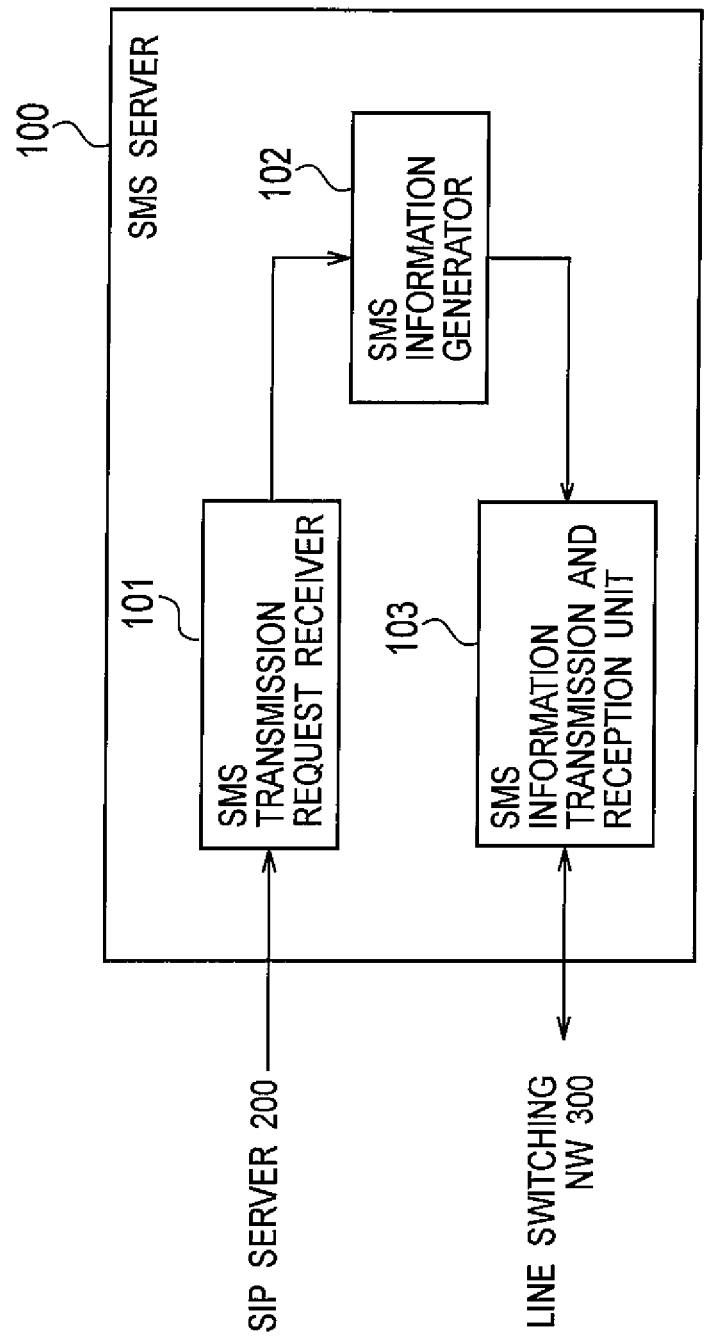
FIG. 7 is a block diagram showing a configuration of an SMS server 100 according to the first embodiment of the present invention.

Hereinafter, a configuration of the SMS server according to the first embodiment of the present invention will be described with reference to the drawing. FIG. 7 is a block diagram showing the configuration of the SMS server 100 according to the first embodiment of the present invention.

As shown in FIG. 7, the SMS server 100 has an SMS transmission request receiver 101, an SMS information generator 102, and an SMS information transmission and reception unit 103.

The SMS transmission request receiver 101 receives the SMS transmission request from the SIP server 200, the SMS transmission request requesting transmission of the SMS information that requests address registration in the SIP server 200. As mentioned above, in addition to the mobile station identification information that identifies each mobile station 10 included in the initial specified mobile station list, the SMS transmission request includes the group ID that identifies the group call started by the initial group.

The SMS information generator 102 generates SMS information transmitted to each mobile station 10 in response to the SMS transmission request received by the SMS transmission request receiver 101. Specifically, the SMS information generator 102 generates an address registration request (SMS (registration request)) for each mobile station 10, the address registration request (SMS (registration request)) requesting registration of the address of the mobile station 10 in the SIP server 200. Here, in addition to the mobile station identification information that identifies each mobile station 10 included in the initial specified mobile station list, the address registration request (SMS (registration request)) includes the group ID that identifies the group call started by the initial group.

As shown in the third embodiment described later, the SMS information generator 102 may generate the SMS information (SMS (notice of application change)) indicating that an application used by the group call is changed. As shown in the fourth embodiment described later, the SMS information generator 102 may generate the SMS information (SMS (notice of participation prohibition)) indicating that halfway participation in the group call is prohibited.

The SMS information transmission and reception unit 103 transmits the SMS information generated by the SMS information generator 102 to the mobile station 10 through the line switching NW 300. Specifically, the SMS information transmission and reception unit 103 transmits the address registration request (SMS (registration request)) generated by the SMS information generator 102 through the line switching NW 300 to the specified mobile station included in the initial specified mobile station list.

(Operation of Communication System)

Hereinafter, operation of the communication system according to the first embodiment of the present invention will be described with reference to the drawings. FIGS. 8 to 13 are sequence diagrams showing the operation of the communication system according to the first embodiment of the present invention.

First, the operation for the start of a group call will be described with reference to FIGS. 8 and 9. In this group call, an initial group is assumed to be a group including the originating mobile station and a mobile station 10 that responds a call from the originating mobile station among the specified mobile stations specified by the originating mobile station.

In the first embodiment, as mentioned above, the mobile station 10a is the originating mobile station, and the mobile station 10b to the mobile station 10d are the specified mobile stations specified by the mobile station 10a.

Figure 8:
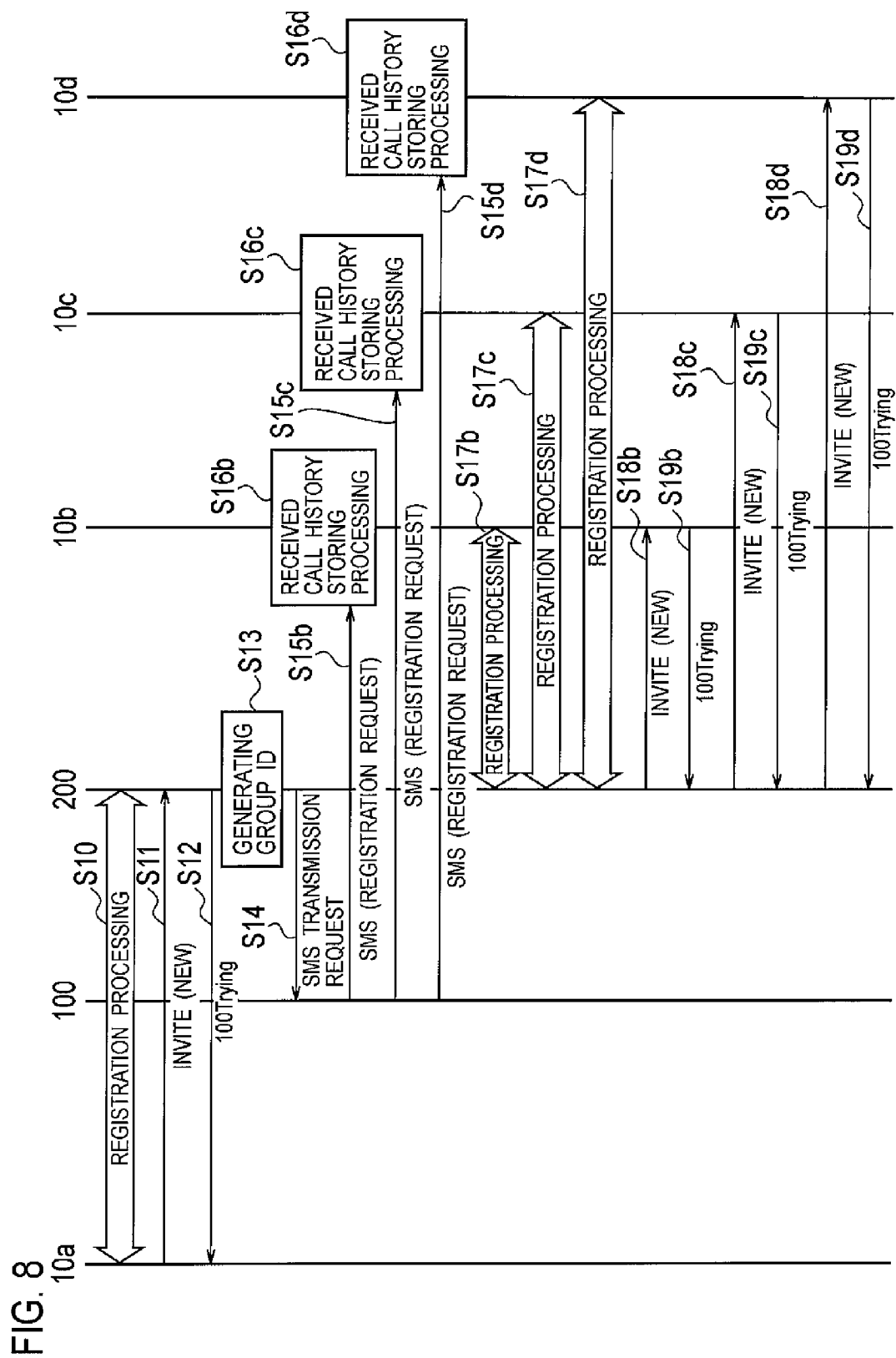
FIG. 8 is a sequence diagram showing operation of the communication system according to the first embodiment of the present invention (1).

As shown in FIG. 8, at Step 10, the mobile station 10a logs in to the SIP server 200 connected to the packet switching NW 400. Specifically, the mobile station 10a performs processing to register the address of the mobile station 10a in the SIP server 200 (address registration).

At Step 11, the mobile station 10a transmits an INVITE (new) to the SIP server 200 to start a new group call. Here, the INVITE (new) is the SIP information that requests start of the new group call, and includes the mobile station identification information that identifies each of the mobile station 10b to the mobile station 10d (for example, telephone number), as well as the mobile station identification information that identifies the mobile station 10a.

At Step 12, in response to the INVITE (new), the SIP server 200 transmits a provisional response (100Trying) indicating start of processing to call the mobile stations 10b to 10d to the mobile station 10a.

At Step 13, the SIP server 200 generates a group ID that identifies the group call in which the mobile station 10a to the mobile station 10d are specified as the mobile station.

At Step 14, the SIP server 200 transmits an SMS transmission request to the SMS server 100, the SMS transmission request requesting transmission of the address registration request (SMS (registration request)) that requests the mobile station 10b to the mobile station 10d for address registration in the SIP server 200. Here, in addition to the mobile station identification information that identifies each of the mobile station 10a to the mobile station 10d, the SMS transmission request includes the group ID generated at Step 13.

At Step 15b to Step 15d, the SMS server 100 transmits an address registration request (SMS (registration request)) through the line switching NW 300 to the mobile station 10b to the mobile station 10d, the address registration request (SMS (registration request)) requesting address registration in the SIP server 200. Here, the SMS (registration request) includes the mobile station identification information, and the group ID generated at Step 13, the mobile station identification information identifying each of the mobile station 10a to the mobile station 10d.

At Step 16b to Step 16d, the mobile station 10b to the mobile station 10d store the mobile station identification information and the group ID included in the SMS (registration request) as a received call history.

At Step 17b to Step 17d, the mobile stations 10b to 10d log in to the SIP server 200 connected to the packet switching NW 400. Specifically, the mobile stations 10b to 10d perform registration processing to register the address of the mobile stations 10b to 10d in the SIP server 200.

At Step 18b to Step 18d, in order to call the mobile stations 10b to 10d, in response to the INVITE (new) received from the mobile station 10a, the SIP server 200 transmits the INVITE (new) to the mobile stations 10b to 10d through the packet switching NW 400.

At Step 19b to Step 19d, as shown in FIG. 8, the mobile stations 10b to 10d transmit a provisional response (100Trying) indicating reception of the INVITE (new) to the SIP server 200.

Figure 9:
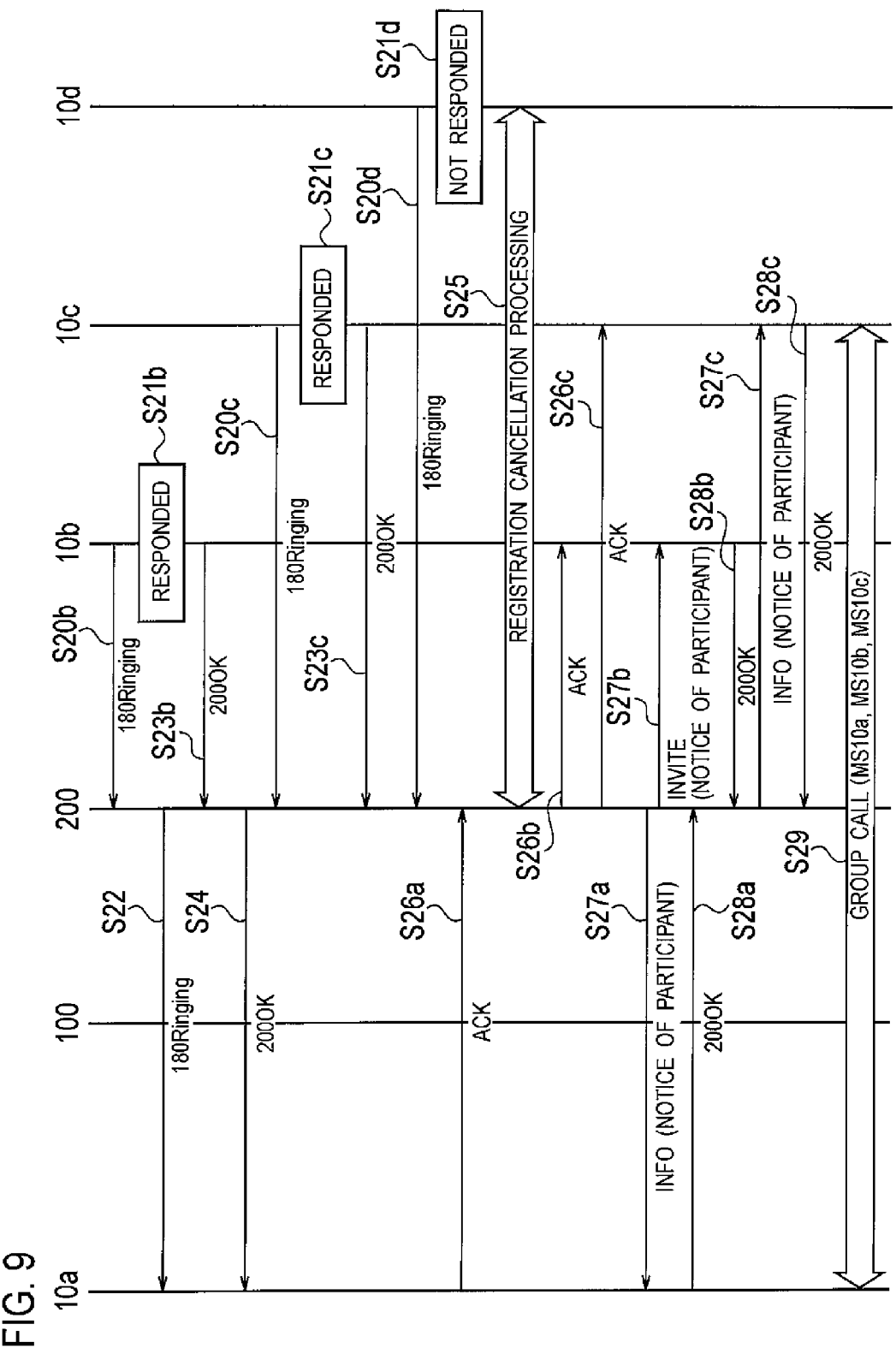
FIG. 9 is a sequence diagram showing the operation of the communication system according to the first embodiment of the present invention (2).

Subsequently, as shown in FIG. 9, at Step 20b to Step 20d, the mobile stations 10b to 10d transmit a provisional response (180ringing) indicating received call processing in progress to the SIP server 200 in response to the INVITE (new).

At Step 21b to Step 21c, the mobile station 10b and the mobile station 10c respond the INVITE (new). Specifically, users of the mobile station 10b and the mobile station 10c notice a call from the mobile station 10a, and perform responding processing to press down the responding key, etc. On the other hand, the mobile station 10d does not respond the INVITE (new) at Step 21d. Specifically, a user of the mobile station 10d does not perform responding processing to press down the responding key, etc., in response to the call from the mobile station 10a.

At Step 22, the SIP server 200 transmits a provisional response (180ringing) to the mobile station 10a, the provisional response (180ringing) indicating that the SIP server 200 is calling the mobile stations 10b to 10d.

At Step 23b and Step 23c, the mobile station 10b and the mobile station 10c transmit to the SIP server 200 a successful response (200OK) indicating that the mobile station 10b and the mobile station 10c have responded the INVITE (new).

At Step 24, the SIP server 200 transmits to the mobile station 10a a successful response (200OK) indicating that either of the mobile stations 10b to 10d has responded the INVITE (new).

At Step 25, the mobile station 10d performs address cancellation processing to cancel address registration in the SIP server 200.

At Step 26a, the mobile station 10a transmits to the SIP server 200 an ACK for confirming that it is possible to start a new group call. Similarly, at Step 26b and Step 26c, the SIP server 200 transmits to the mobile station 10b and the mobile station 10c an ACK for confirming that it is possible to start the new group call.

At Step 27a to Step 27c, the SIP server 200 transmits, to the mobile station 10a to the mobile station 10c, INFO (notice of participant) including the mobile station identification information (for example, telephone number and SIP address) that identifies the mobile station 10 that participates in the new group call.

At Step 28a to Step 28c, the mobile station 10a to the mobile station 10c transmit to the SIP server 200 a successful response (200OK) indicating reception of the INFO (notice of participant).

At Step 29, the mobile station 10a to the mobile station 10c start a group call (MS10a, MS10b, MS10c) among the participating members of the mobile station 10a to the mobile station 10c.

Figure 10:
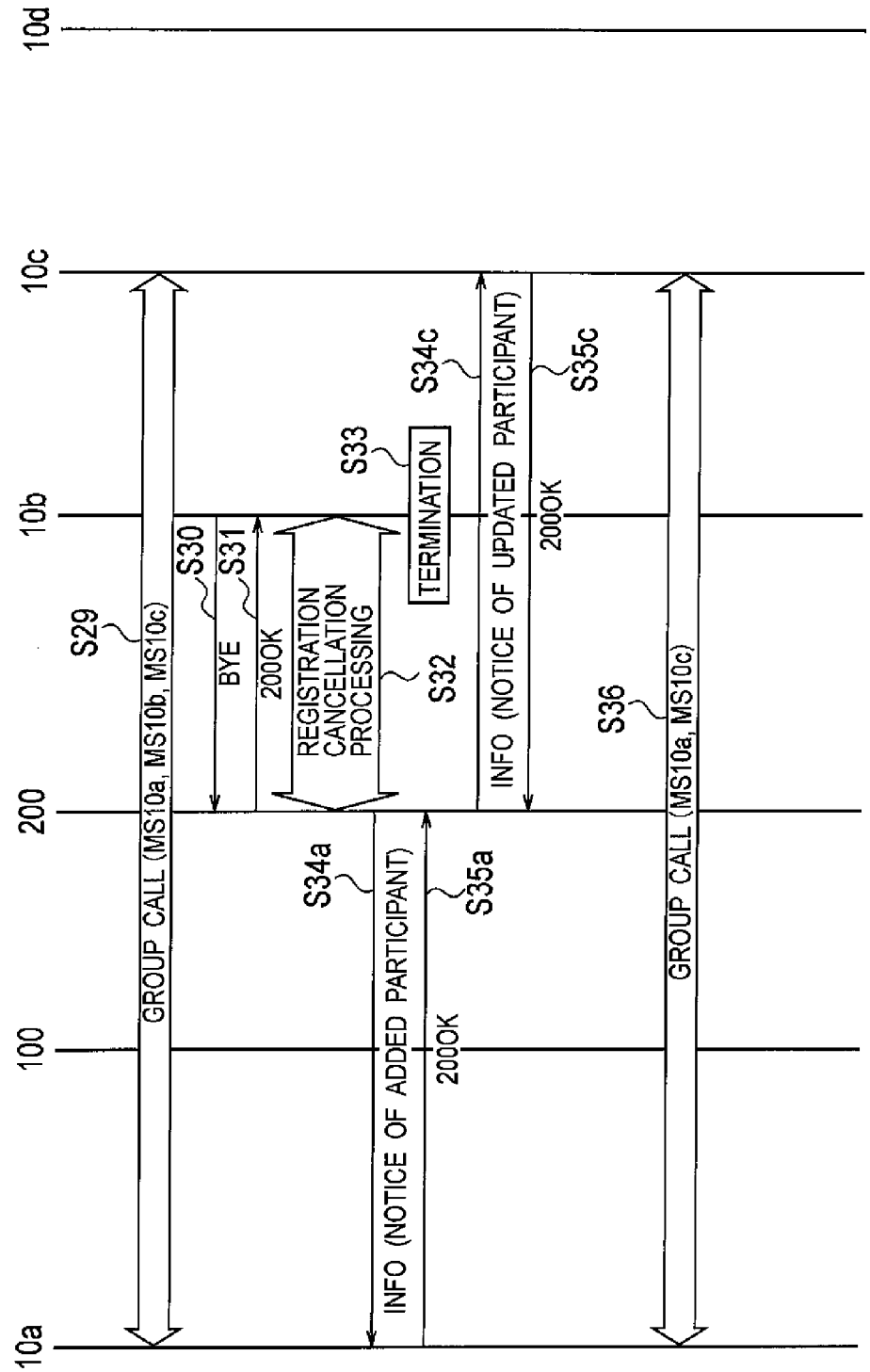
FIG. 10 is a sequence diagram showing the operation of the communication system according to the first embodiment of the present invention (3).

Next, operation when the mobile station 10b withdraws from the group call among the participating members of the mobile station 10a to the mobile station 10c will be described with reference to FIG. 10. FIG. 10 is a diagram showing processing subsequent to Step 29 shown in FIG. 9.

As shown in FIG. 10, at Step 29, the group call (MS10a, MS10b, MS10c) among the participating members of the mobile station 10a to the mobile station 10c is continuing.

At Step 30, the mobile station 10b transmits a withdrawal request (BYE) that requests withdrawal from the group call to the SIP server 200.

At Step 31, the SIP server 200 transmits a successful response (200OK) indicating reception of the withdrawal request (BYE) to the mobile station 10b.

At Step 32, the mobile station 10b performs address cancellation processing to cancel address registration in the SIP server 200.

At Step 33, the mobile station 10b terminates an application used for the group call and the like, and ends the group call.

At Step 34a and Step 34c, the SIP server 200 transmits, to the mobile station 10a and the mobile station 10c, INFO (notice of updated participant) indicating update of the mobile stations 10 that participate in the group call. The INFO (notice of updated participant) is information indicating withdrawal of the mobile station 10b from the group call, etc.

At Step 35a and Step 35c, the mobile station 10a and the mobile station 10c transmit to the SIP server 200 a successful response (200OK) indicating reception of the INFO (notice of updated participant).

At Step 36, the mobile station 10a and the mobile station 10c continue the group call (MS10a, MS10c) between the participating members of the mobile station 10a and the mobile station 10c.

Figure 11:
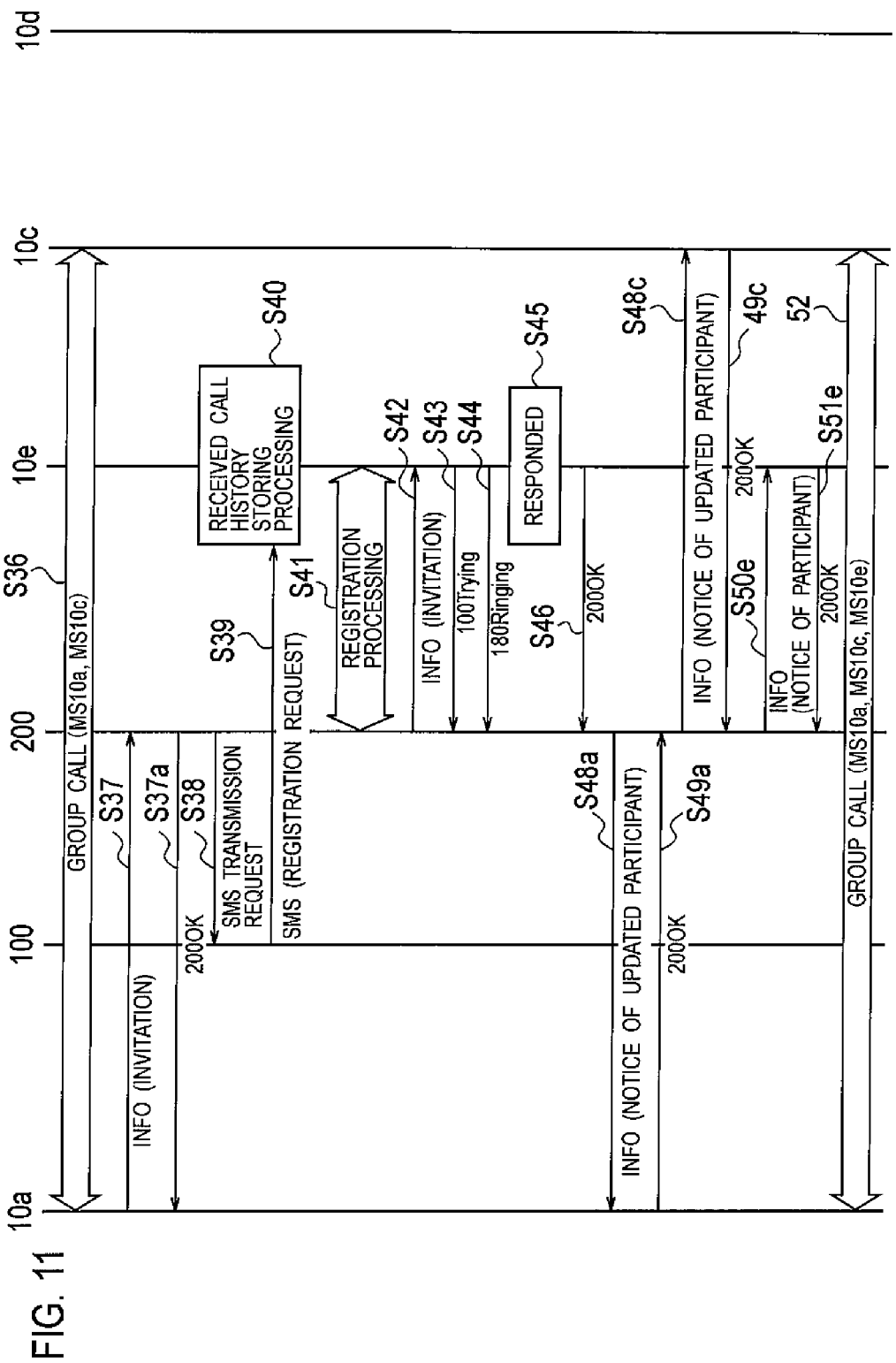
FIG. 11 is a sequence diagram showing the operation of the communication system according to the first embodiment of the present invention (4).

Next, FIG. 11 will describe operation in the case where the mobile station 10a invites a mobile station 10e to participate halfway in the group call between the participating members of the mobile station 10a and the mobile station 10c. FIG. 11 is a diagram showing processing subsequent to Step 36 shown in FIG. 10.

As shown in FIG. 11, at Step 36, the group call (MS10a, MS10c) between the participating members of the mobile station 10a and the mobile station 10c is continuing.

At Step 37, the mobile station 10a transmits SIP information (INFO (invitation)) for inviting the mobile station 10e to the group call, through the packet switching NW 400 to the SIP server 200. Here, the INFO (invitation) includes the mobile station identification information that identifies the mobile station 10e (for example, telephone number).

At Step 37a, the SIP server 200 transmits to the mobile station 10a a successful reception (200OK) indicating reception of the SIP information (INFO (invitation)) that invites the mobile station 10e to the group call.

At Step 38, the SIP server 200 transmits to the SMS server 100 the SMS transmission request requesting transmission of the address registration request (SMS (registration request)) that requests address registration in the SIP server 200. Here, in addition to the mobile station identification information that identifies each of the mobile station 10a, the mobile station 10c, and the mobile station 10e, the SMS transmission request includes the group ID generated at Step 13. The SMS transmission request may include the mobile station identification information that identifies each mobile station 10 (mobile station 10a to mobile station 10d) included in the initial specified mobile station list.

At Step 39, the SMS server 100 transmits the address registration request (SMS (registration request)) that requests address registration in the SIP server 200, through the line switching NW 300 to the mobile station 10e. Here, the SMS (registration request) includes the mobile station identification information that identifies each of the mobile station 10a, the mobile station 10c, and the mobile station 10e, and the group ID generated at Step 13. The SMS (registration request) may include the mobile station identification information that identifies each mobile station 10 (mobile station 10a to mobile station 10d) included in the initial specified mobile station list.

At Step 40, the mobile station 10e stores the mobile station identification information and the group ID included in the SMS (registration request) as a received call history.

At Step 41, the mobile station 10e logs in to the SIP server 200 connected to the packet switching NW 400. Specifically, the mobile station 10e performs registration processing to register the address of the mobile station 10e in the SIP server 200.

At Step 42, the SIP server 200 transmits INFO (invitation) to the mobile station 10e to call the mobile station 10e in response to the SIP information (INFO (invitation)) received from the mobile station 10a.

At Step 43, the mobile station 10e transmits to the SIP server 200 a provisional response (100Trying) indicating reception of the INFO (invitation).

At Step 44, in response to the INFO (invitation), the mobile station 10e transmits to the SIP server 200 a provisional response (180Ringing) indicating received call processing in progress.

At Step 45, the mobile station 10e responds the INFO (invitation). Specifically, a user of the mobile station 10e notices a call from the mobile station 10a, and performs responding processing to press down the responding key, etc.

At Step 46, the mobile station 10e transmits to the SIP server 200 a successful response (200OK) indicating that the mobile station 10e has responded the INFO (invitation).

At Step 48a and Step 48c, the SIP server 200 transmits, to the mobile station 10a and the mobile station 10c, INFO (notice of updated participant) indicating update of the mobile stations 10 that participate in the group call. The INFO (notice of updated participant) is information indicating the mobile station 10e's halfway participation in the group call (mobile station identification information that identifies mobile station 10e (telephone number and SIP address)), etc.

At Step 49a and Step 49c, the mobile station 10a and the mobile station 10c transmit to the SIP server 200 a successful response (200OK) indicating reception of the INFO (notice of updated participant).

At Step 50e, the SIP server 200 transmits, to the mobile station 10e, INFO (notice of participant) including the mobile station identification information (for example, the telephone number and the SIP address) that identifies each mobile station 10 that participates in the group call.

At Step 51e, the mobile station 10e transmits to the SIP server 200 a successful response (200OK) indicating reception of the INFO (notice of participant).

At Step 52, the mobile station 10a, the mobile station 10c, and the mobile station 10e start a group call (MS10a, MS10c, MS10e) among the participating members of the mobile station 10a, the mobile station 10c, and the mobile station 10e.

Figure 12:
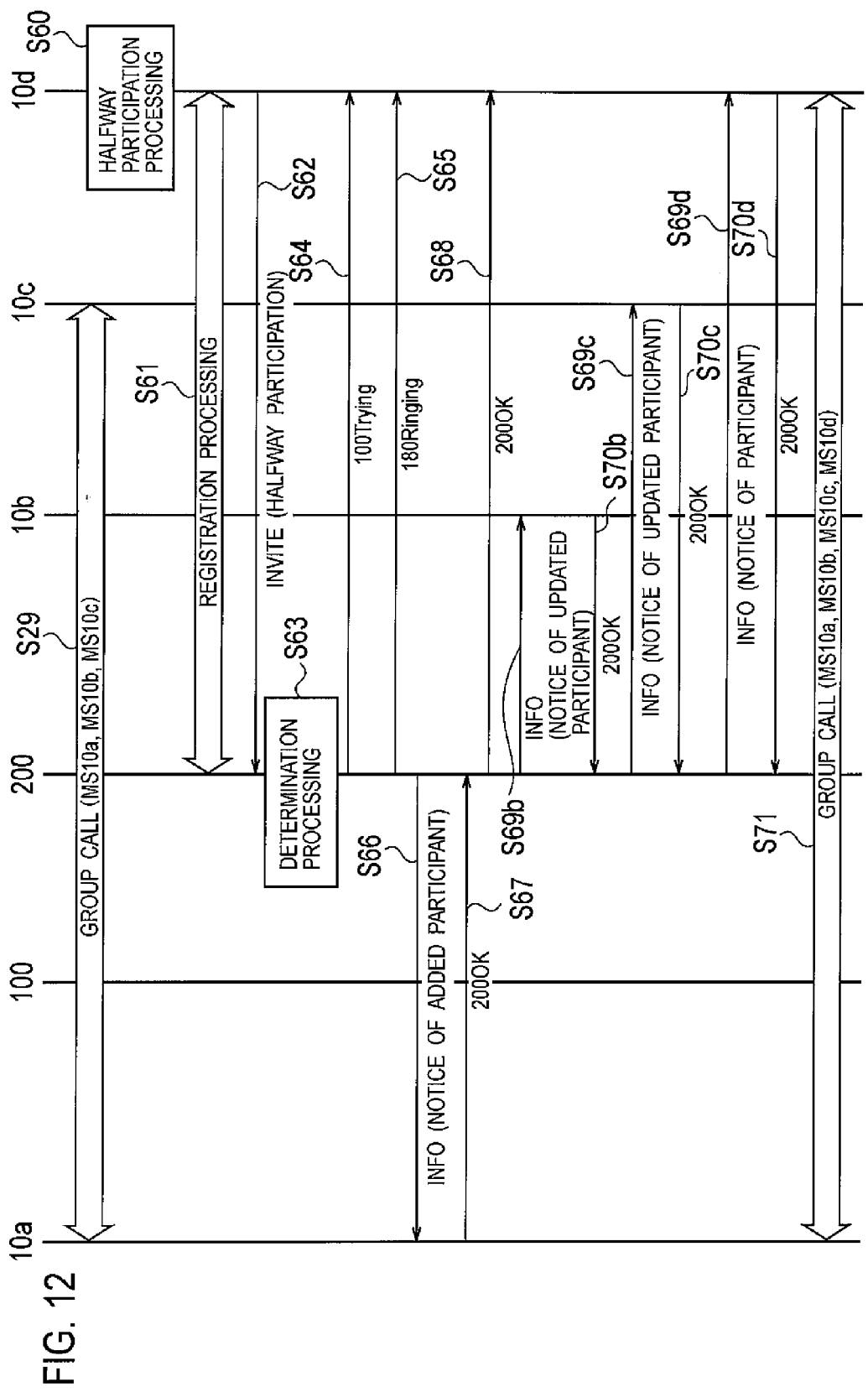
FIG. 12 is a sequence diagram showing the operation of the communication system according to the first embodiment of the present invention (5).

Next, FIG. 12 will describe operation in the case where the mobile station 10d included in the initial specified mobile station list can participate halfway in the group call (MS10a, MS10b, and MS10c) among the participating members of the mobile station 10a to the mobile station 10c. FIG. 12 is a diagram showing processing subsequent to Step 29 shown in FIG. 9.

As shown in FIG. 12, at Step 29, the group call among the participating members of the mobile station 10a to the mobile station 10c is continuing.

At Step 60, the mobile station 10d performs halfway participation processing to participate in the group call halfway. Specifically, a user of the mobile station 10d selects a desired group call out of the received call history stored in the memory 19, and performs processing to press down the calling key, etc.

At Step 61, the mobile station 10d logs in to the SIP server 200 connected to the packet switching NW 400. Specifically, the mobile station 10d performs processing to register the address of the mobile station 10d in the SIP server 200 (registration processing).

At Step 62, the mobile station 10d transmits an INVITE (halfway participation) to the SIP server 200 through the packet switching NW 400, the INVITE (halfway participation) requesting to participate in the desired group call selected at the step 60. Here, the INVITE (halfway participation) includes the group ID in association with the desired group call. The group ID is stored as the received call history in the memory 19, as mentioned above.

At Step 63, the SIP server 200 determines whether or not halfway participation in the group call corresponding to the group ID included in the INVITE (halfway participation) is possible. Specifically, the SIP server 200 determines that the mobile station 10d can participate halfway when the group call associated with the group ID is continuing. On the other hand, the SIP server 200 determines that the mobile station 10d cannot participate halfway when the group call associated with the group ID is completed. In FIG. 12, since the group call among the participating members of the mobile station 10a to the mobile station 10c, the SIP server 200 determines that the mobile station 10d can participate halfway.

At Step 64, in response to the INVITE (halfway participation), the SIP server 200 transmits to the mobile station 10d a provisional response (100Trying) indicating start of halfway participation processing for the mobile station 10d.

At Step 65, the SIP server 200 transmits to the mobile station 10d a provisional response (180Ringing) indicating calling of the mobile station 10a.

At Step 66, the SIP server 200 transmits, to the mobile station 10a, INFO (notice of updated participant) indicating update of the mobile stations 10 that participate in the group call. The INFO (notice of updated participant) is information indicating halfway participation in the group call of the mobile station 10d (mobile station identification information that identifies the mobile station 10d), etc.

At Step 67, the mobile station 10a transmits to the SIP server 200 a successful response (200OK) indicating reception of the INFO (notice of updated participant).

At Step 68, the SIP server 200 transmits to the mobile station 10d a successful response (200OK) indicating acceptance of halfway participation of the mobile station 10d.

At Step 69b and Step 69c, the SIP server 200 transmits INFO (notice of updated participant) indicating update of the mobile stations 10 that participate in the group call, to the mobile station 10b and the mobile station 10c. At Step 69d, the SIP server 200 transmits to the mobile station 10d the INFO (notice of participant) including the mobile station identification information that identifies each mobile station 10 that participates in the group call (for example, telephone number and SIP address).

At Step 70b and Step 70c, the mobile station 10b and the mobile station 10c transmit to the SIP server 200 a successful response (200OK) indicating reception of the INFO (notice of updated participant). Furthermore, at Step 70d, the mobile station 10d transmits to the SIP server 200 a successful response (200OK) indicating reception of the INFO (notice of participant).

At Step 71, the mobile station 10a to the mobile station 10d start a group call among the participating members of the mobile station 10a to the mobile station 10d.

Figure 13:
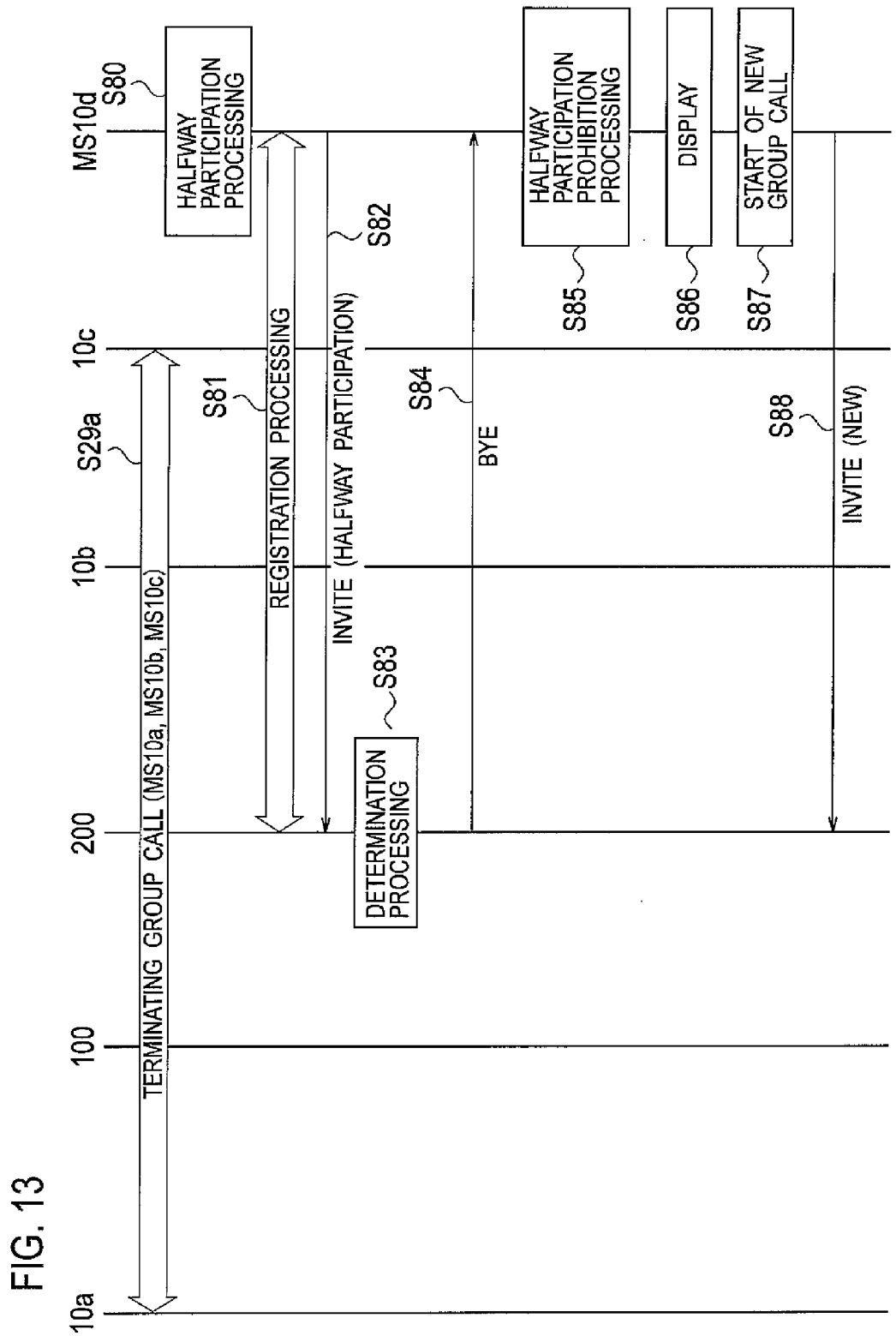
FIG. 13 is a sequence diagram showing the operation of the communication system according to the first embodiment of the present invention (6).

Finally, FIG. 13 describes operation in the case where the mobile station 10d included in the initial specified mobile station list cannot halfway participate in a group call (MS10a, MS10b, MS10c) among the participating members of the mobile station 10*a* to the mobile station 10*c*. FIG. 13 is a diagram showing processing subsequent to Step 29 shown in FIG. 9.

As shown in FIG. 13, at Step 29*a*, the group call (MS10*a*, MS10*b*, MS10*c*) among the participating members of the mobile station 10*a* to the mobile station 10*c* is completed.

At Step 80, in the same manner as at Step 60, the mobile station 10*d* performs halfway participation processing in order to participate in the group call halfway. Specifically, the user of the mobile station 10*d* selects a desired group call out of the received call history stored in the memory 19, and performs processing to press down the calling key, etc.

At Step 81, in the same manner as at Step 61, the mobile station 10*d* logs in to the SIP server 200 connected to the packet switching NW 400. Specifically, the mobile station 10*d* performs processing (registration processing) to register the address of the mobile station 10*d* in the SIP server 200.

At Step 82, in the same manner as at Step 62, the mobile station 10*d* transmits an INVITE (halfway participation) to the SIP server 200 through the packet switching NW 400, the INVITE (halfway participation) requesting participation in the desired group call selected at Step 80. Here, the INVITE (halfway participation) includes the group ID associated with the desired group call. The group ID is stored in the memory 19 as the received call history, as mentioned above.

At Step 83, in the same manner as at Step 63, the SIP server 200 determines whether or not halfway participation in the group call associated with the group ID included in the INVITE (halfway participation) is possible. Specifically, when the group call associated with the group ID is continuing, the SIP server 200 determines that the mobile station 10*d* can participate halfway. On the other hand, when the group call associated with the group ID is completed, the SIP server 200 determines that the mobile station 10*d* cannot participate halfway. In FIG. 13, since the group call formed of the mobile station 10*a* to the mobile station 10*c* as the participating member is completed, the SIP server 200 determines that the mobile station 10*d* cannot participate halfway.

At Step 84, the SIP server 200 transmits a response failure (BYE) to the mobile station 10*d*, the response failure (BYE) indicating that halfway participation of the mobile station 10*d* is impossible.

At Step 85, the mobile station 10*d* performs halfway participation prohibition processing to prohibit use of the group ID associated with the desired group call selected at Step 80. Specifically, the mobile station 10*d* updates the inhibit flag associated with the group ID to "1 (invalid)."

At Step 86, the mobile station 10*d* displays the information indicating halfway participation of the mobile station 10*d* is impossible. Specifically, the mobile station 10*d* displays the information such as "Group call is completed. Start a new group call?"

Thus, the mobile station 10*d* can also display information for the user of the mobile station 10*d* to select whether or not to start a new group call by specifying the mobile stations 10 that were performing the group call in which the mobile station 10*d* has been prohibited from participating halfway. In FIG. 13, a case where the user of the mobile station 10*d* selects to start a new group call will be further described.

At Step 87, the mobile station 10*d* starts a new group call formed of the mobile stations 10, which were performing the desired group call selected at Step 80, as the mobile stations. Specifically, the user of the mobile station 10*d* specifies the specified mobile station 10 as the originating mobile station, and performs processing to press down the calling key, etc.

The mobile stations associated with the new group call may be the same as the mobile stations associated with the desired group call selected at Step 80 (mobile station 10*a* to mobile station 10*d*), or may be a group formed of the mobile stations 10 (for example, mobile station 10*a*, mobile station 10*b*, and mobile station 10*d*) specified out of the mobile stations associated with the desired group call selected at Step 80. Alternatively, the mobile stations associated with the new group call may include the mobile station 10 that participates in the desired group call halfway (for example, mobile station 10*e* shown in FIG. 11).

At Step 88, in order to start the new group call, the mobile station 10*d* transmits the INVITE (new) to the SIP server 200 through the packet switching NW 400. Here, the INVITE (new) is SIP information that requests start of the new group call, and includes the mobile station identification information that identifies each mobile station 10 specified at Step 87, in addition to the mobile station identification information that identifies the mobile station 10*d* (for example, telephone number).

Since processing to start the new group call is the same as the processing shown in FIG. 8, description of processing after Step 88 will be omitted.

(Effects and Advantages)

According to the first embodiment of the present invention when participating in a group call halfway, the mobile station 10 transmits an INVITE (halfway participation) to the SIP server 200, the INVITE (halfway participation) including the group ID that identifies the group call.

Accordingly, even when a plurality of group calls have started with the same mobile station specified are continuing, the mobile station 10 can specify the desired group call by use of the group ID. In other words, the mobile station 10 can easily participate in the desired group call halfway by oneself without invitation from the mobile station 10 that participates in the desired group call.

Particularly, since the mobile station 10 can easily participate in the desired group call halfway even when the user does not notice a call (INVITE (new)) from the originating mobile station, convenience for a user improves.

With the mobile station 10 according to the first embodiment of the present invention, the mobile station 10 acquires the group ID that identifies the group call, using the address registration request (SMS (registration request)) received from the SMS server 100 through the line switching NW 300.

Accordingly, even in the case where the mobile station 10 is not located within a sector managed by the base station 40 included in the packet switching NW 400, when the mobile station 10 is located within a sector managed by the base station 30 included in the line switching NW 300, the mobile station 10 can acquire the group ID that identifies the group call. In short, a possibility of acquiring the group ID can be improved, compared with the case where the group ID is acquired through the packet switching NW 400.

As a result, the mobile station 10 can easily participate in a desired group call halfway when the mobile station 10 is located within the sector managed by the base station 40 included in the packet switching NW 400, and convenience for the user improves.

Furthermore, with the mobile station 10 according to the first embodiment of the present invention, the mobile station 10 prohibits use of the group ID, when halfway participation in the group call fails with use of the INVITE (halfway participation) including the group ID.

Accordingly, useless transmission of an INVITE (halfway participation) for halfway participation in the group call already ended can be prevented, and effective use of network resource can be attained.

With the mobile station 10 according to the first embodiment of the present invention, when use of the group ID is prohibited, the mobile station 10 provides information on a display so that the user of the mobile station 10 can select whether or not to start a new group call by specifying the mobile stations 10 that were performing the group call associated with the group ID.

Accordingly, even when the desired group call is completed, the user can specify the mobile stations 10 that were performing the desired group call to easily start a new group call, and convenience for the user improves.

Second Embodiment

Hereinafter, a second embodiment of the present invention will be described with reference to the drawings. Differences between the first embodiment mentioned above and the second embodiment will be mainly described below.

Specifically, in the first embodiment mentioned above, since the mobile station 10*d* does not respond the call from the mobile station 10*a*, the mobile station 10*d* does not participate in the group call. On the other hand, in the second embodiment, since the mobile station 10*d* cannot receive a call from the mobile station 10*a*, the mobile station 10*d* cannot participate in the group call.

(Operation of Communication System)

Figure 14:
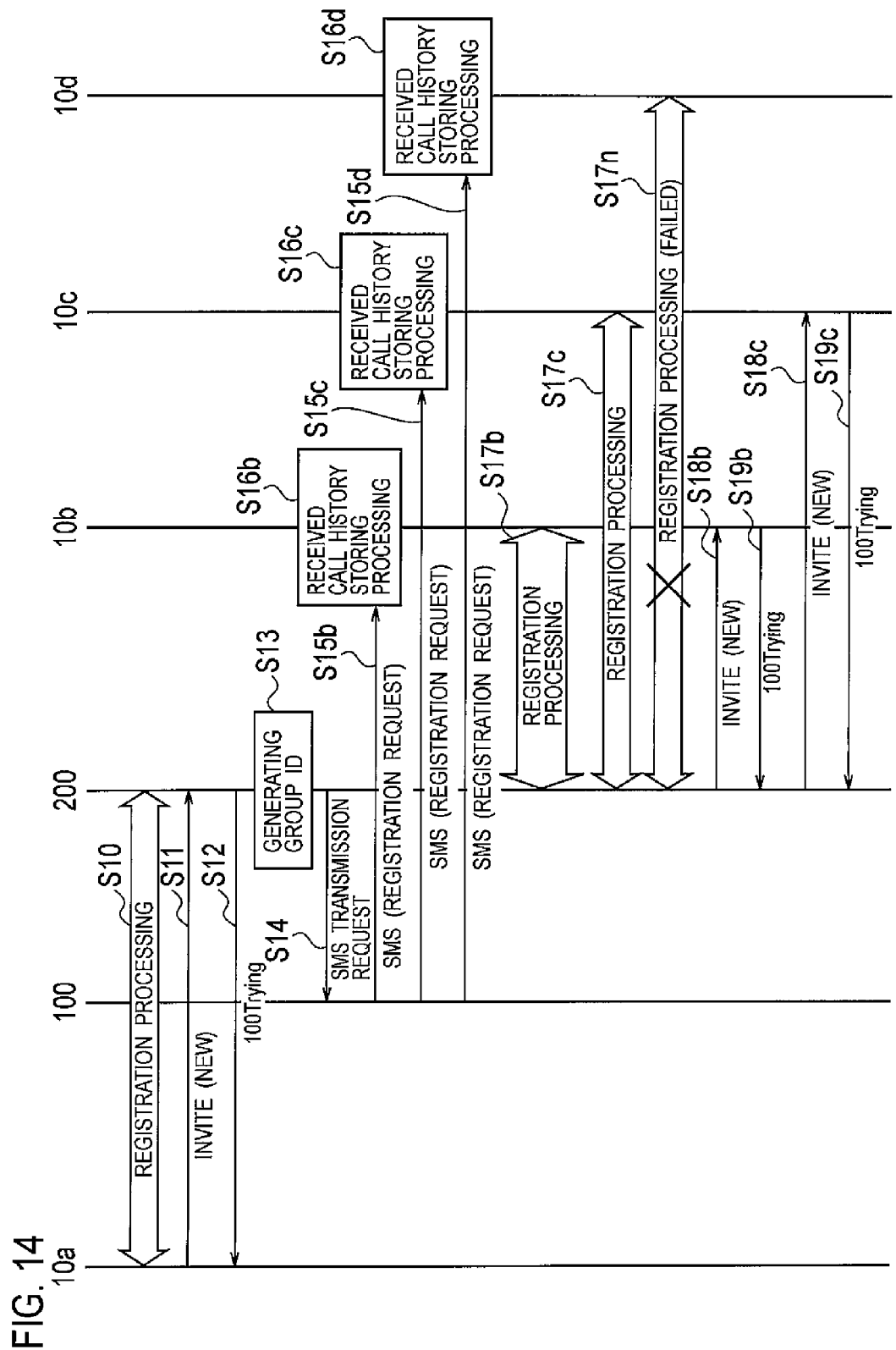
FIG. 14 is a sequence diagram showing operation of a communication system according to a second embodiment of the present invention.

Hereinafter, operation of a communication system according to the second embodiment of the present invention will be described with reference to the drawings. FIG. 14 is a sequence diagram showing the operation of the communication system according to the second embodiment of the present invention. In FIG. 14, same step numbers are given to the same processings as those shown in FIG. 8. Accordingly, description of the same processings as in FIG. 8 will be omitted below.

As shown in FIG. 14, at Step 17*n*, although the mobile station 10*d* performs registration processing to register the address of the mobile station 10*d* in the SIP server 200 connected to the packet switching NW 400, the registration processing fails. For example, when the mobile station 10*d* is not located within a sector managed by the base station 40 included in the packet switching NW 400, the mobile station 10*d* fails in the registration processing.

Third Embodiment

Hereinafter, a third embodiment of the present invention will be described with reference to the drawings. Differences between the first embodiment mentioned above and the third embodiment will be mainly described below.

Specifically, in the first embodiment mentioned above, the application used for the group call is not particularly referred to. On the other hand, in the second embodiment, the application used for group call is changed from application 1 (application prior to change) into application 2 (application after change).

(Operation of Communication System)

Figure 15:
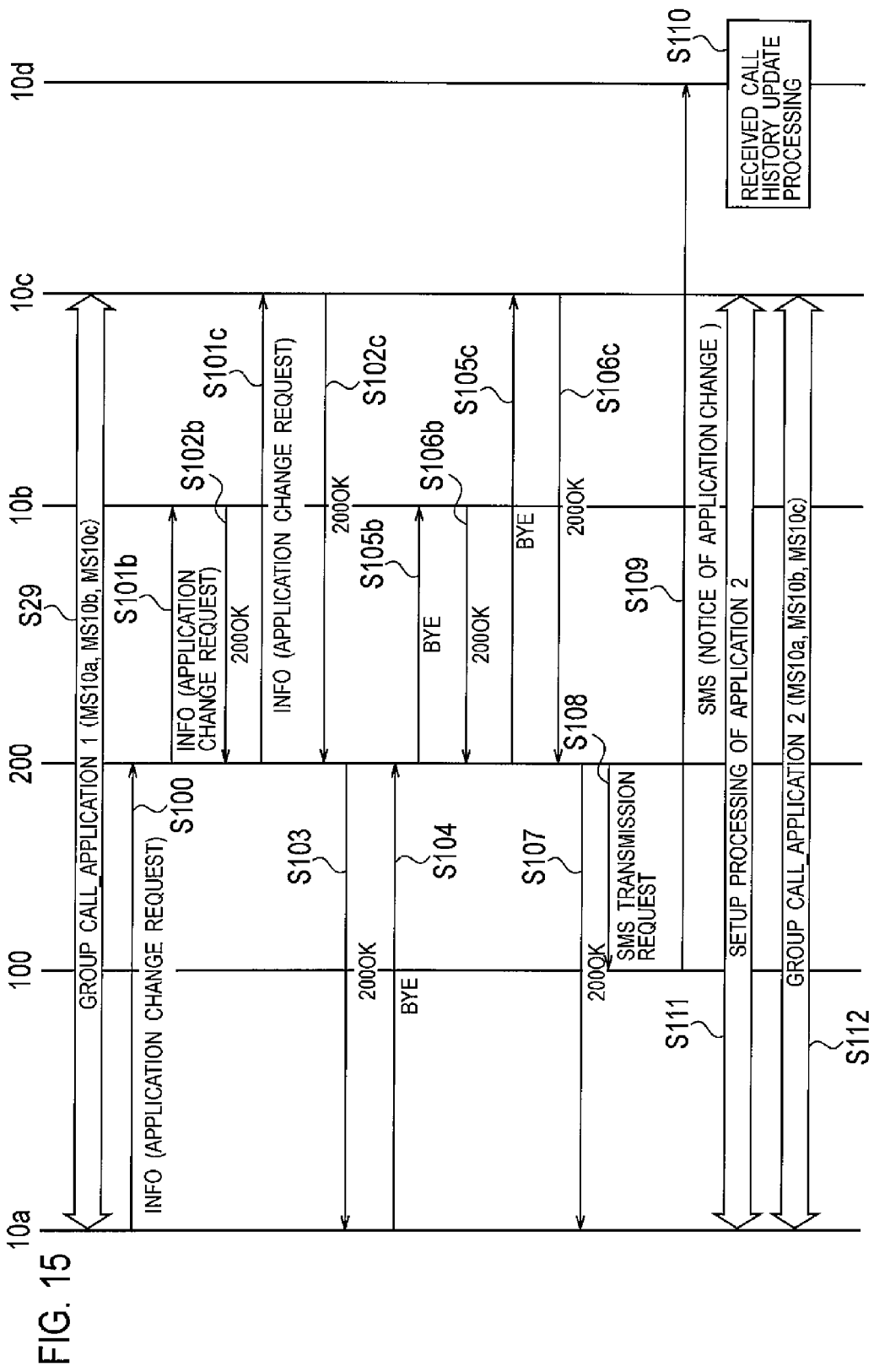
FIG. 15 is a sequence diagram showing operation of a communication system according to a third embodiment of the present invention.

Hereinafter, operation of a communication system according to the third embodiment of the present invention will be described with reference to the drawings. FIG. 15 is a sequence diagram showing the operation of the communication system according to the third embodiment of the present invention. FIG. 15 shows processing subsequent to Step 29 shown in FIG. 9.

As shown in the drawing 15, at Step 29, the group call among the participating members of the mobile station 10*a* to the mobile station 10*c* is continuing. In the group call, application 1 (for example, IP-TV) is used.

Here, the IP-TV is the group call application that allows transmission and reception of the voice signal and the image signal, as mentioned above.

At Step 100, the mobile station 10*a* transmits to the SIP server 200 the INFO (application change request) requesting to change the application used in the group call from application 1 into application 2 (for example, PTT (Push-To-Talk)).

Here, the PTT is the group call application that allows transmission and reception of only the voice signal, as mentioned above.

As a case where the application is changed, cases are assumed where received signal strength of the image signal becomes smaller than a predetermined threshold due to deterioration of a radio wave condition while performing the group call using the IP-TV, etc. In such a case, the application is changed to the PTT that uses the voice signal having a signal quantity smaller than that of the image signal.

As another case where the application is changed, cases are assumed where received signal strength of the voice signal becomes larger than a predetermined threshold due to improvement of a radio wave condition while performing the group call using the PTT, etc. In such a case, the application is changed to the IP-TV that uses the image signal having a larger signal quantity than that of the voice signal.

Apparently, the application used for the group call may be changed according to needs of the user.

At Step 101*b* and Step 10*c*, the SIP server 200 transmits the INFO (application change request) received from the mobile station 10*a* to the mobile station 10*b* and the mobile station 10*c*.

At Step 102*b* and Step 102*c*, the mobile station 10*b* and the mobile station 10*c* transmit to the SIP server 200 a successful response (200OK) indicating reception of the INFO (application change request).

At Step 103, the SIP server 200 transmits to the mobile station 10*a* a successful response (200OK) indicating that the mobile station 10*b* and the mobile station 10*c* have received the INFO (application change request).

At Step 104, the mobile station 10*a* transmits to the SIP server 200 a termination request (BYE) that requests termination of application 1.

At Step 105*b* and Step 105*c*, the SIP server 200 transmits the termination request (BYE) that requests termination of application 1, to the mobile station 10*b* and the mobile station 10*c*.

At Step 106*b* and Step 106*c*, the mobile station 10*b* and the mobile station 10*c* transmit to the SIP server 200 a successful response (200OK) indicating reception of the termination request (BYE).

At Step 107, the SIP server 200 transmits to the mobile station 10*a* a successful response (200OK) indicating that the mobile station 10*b* and the mobile station 10*c* have terminated application 1.

At Step 108, the SIP server 200 transmits to the SMS server 100 an SMS transmission request requesting transmission of an SMS information (SMS (notice of application change)) that informs that the application used in the group call has changed from application 1 into application 2.

At Step 109, the SMS server 100 transmits the SMS (notice of application change) to the mobile station 10*d* through the line switching NW 300, the SMS (notice of application change) informing that the application used in the group call has changed from application 1 into application 2. Here, the SMS (notice of application change) is the SMS information including application information to specify application 2.

At Step 110, the mobile station 10d updates a received call history stored in the memory 19. Specifically, the mobile station 10d updates the application used in the group call stored as a received call history from application 1 to application 2.

At Step 111, the mobile station 10a to the mobile station 10c perform setup processing of application 2.

At Step 112, the mobile station 10a to the mobile station 10c, and the mobile station 10e start a group call (MS10a, MS10b, MS10c) using application 2. The participating members of the group call are the mobile station 10a to the mobile station 10c similarly to the case at Step 29.

When participating in the group call halfway, the mobile station 10d selects the application used in the group call with reference to the received call history stored in the memory 19. Since processing for the mobile station 10d to participate in the group call halfway is the same as that of FIGS. 12 and 13 mentioned above, description of the processing will be omitted.

(Effects and Advantages)

According to the third embodiment of the present invention, the mobile station 10 receives the SMS information (SMS (notice of application change)) through the line switching NW 300, the SMS information (SMS (notice of application change)) indicating that the application used in the group call in which the mobile station 10 does not participate has changed. The mobile station 10 updates the received call history on the basis of the received SMS (notice of application change).

Accordingly, when the mobile station 10 transmits the INVITE (halfway participation) to the SIP server 200, the mobile station 10 can request halfway participation in a group call with a suitable application. That is, refusal of halfway participation in the group call due to an attempt to participate in the group call halfway with an application different from the application used in the group call can be prevented.

Fourth Embodiment

Hereinafter, a fourth embodiment of the present invention will be described with reference to the drawing. Differences between the first embodiment mentioned above and the fourth embodiment will be mainly described below.

Specifically, in the first embodiment mentioned above, halfway participation of the mobile station 10d is not particularly prohibited by the mobile station 10a (originating mobile station). On the other hand, in the fourth embodiment, halfway participation of the mobile station 10d is prohibited by the mobile station 10a (originating mobile station).

(Operation of Communication System)

Figure 16:
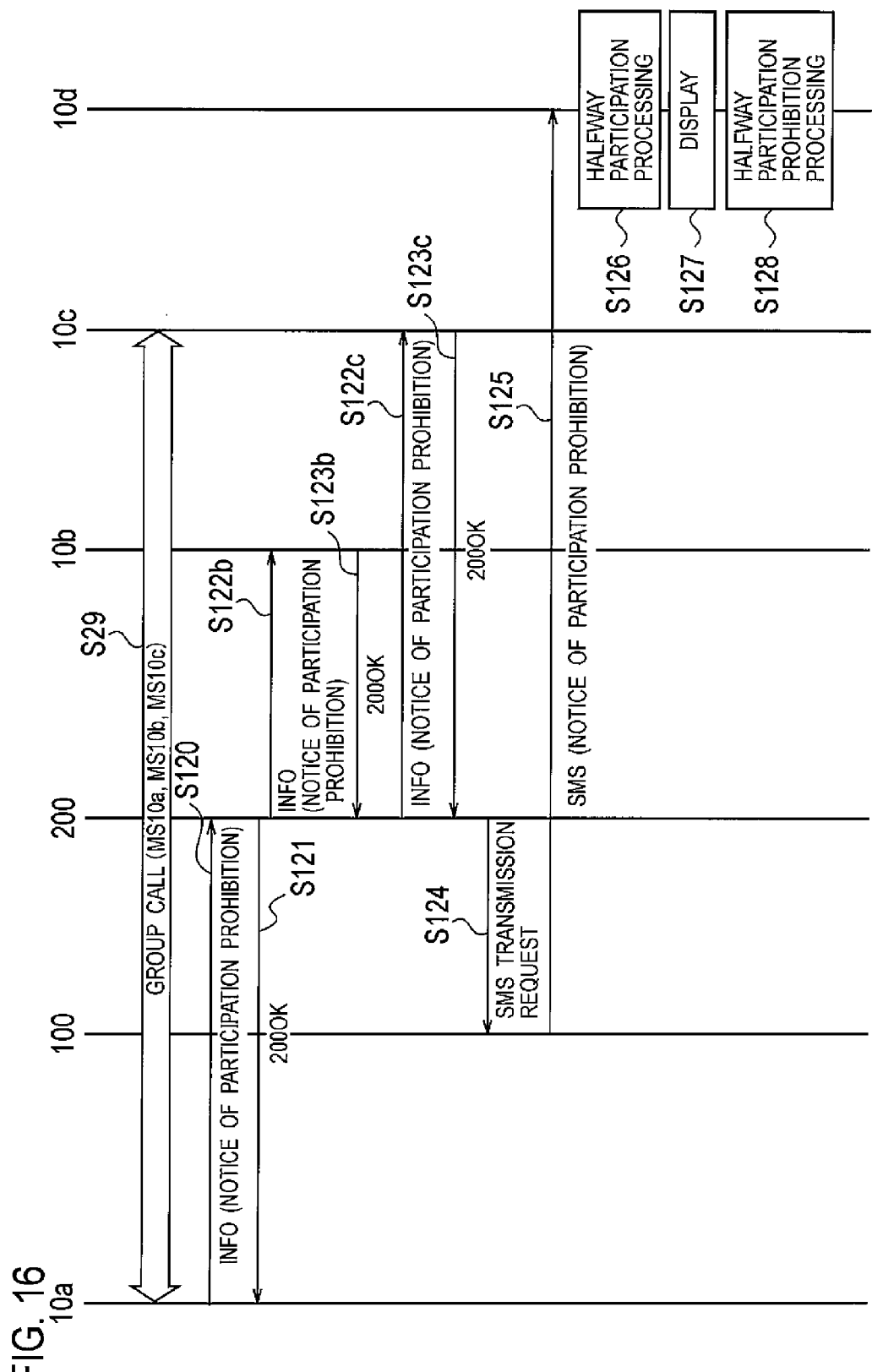
FIG. 16 is a sequence diagram showing operation of a communication system according to a second embodiment of the present invention.

Hereinafter, operation of a communication system according to the fourth embodiment of the present invention will be described with reference to the drawing. FIG. 16 is a sequence diagram showing the operation of the communication system according to the fourth embodiment of the present invention. FIG. 16 shows processing subsequent to Step 29 shown in FIG. 9.

As shown in FIG. 16, at Step 29, the group call among the participating members of the mobile station 10a to the mobile station 10c is continuing.

At Step 120, the mobile station 10a transmits, to the SIP server 200, INFO (notice of participation prohibition) indicating prohibition of halfway participation of the mobile station 10d.

At Step 121, the SIP server 200 transmits to the mobile station 10a a successful response (200OK) indicating reception of the INFO (notice of participation prohibition).

At Step 122b and Step 122c, the SIP server 200 transmits to the mobile station 10b and the mobile station 10c the INFO (notice of participation prohibition) indicating prohibition of halfway participation of the mobile station 10d.

At Step 123b and Step 123c, the mobile station 10b and the mobile station 10c transmit to the SIP server 200 a successful response (200OK) indicating reception of the INFO (notice of participation prohibition).

At Step 124, the SIP server 200 transmits to the SMS server 100 the SMS transmission request requesting transmission of an SMS information (SMS (notice of participation prohibition)) indicating prohibition of halfway participation in the group call.

At Step 125, the SMS server 100 transmits the SMS (notice of participation prohibition) indicating prohibition of halfway participation in the group call, to the mobile station 10d through the line switching NW 300.

At Step 126, the mobile station 10d performs halfway participation processing in order to participate in the group call halfway. Specifically, the user of the mobile station 10d selects a desired group call out of the received call history stored in the memory 19, and performs processing to press down the calling key, etc.

At Step 127, the mobile station 10d displays information indicating that halfway participation in the desired group call is prohibited. For example, the mobile station 10d displays information such as "halfway participation in the group call is prohibited."

At Step 128, the mobile station 10d performs halfway participation prohibition processing to prohibit halfway participation in the desired group call selected at Step 126. Specifically, the mobile station 10d updates the inhibit flag associated with the desired group call to "1 (invalid)."

(Effects and Advantages)

With the mobile station 10 according to the fourth embodiment of the present invention, the mobile station 10 receives through the line switching NW 300 the SMS information (SMS (notice of participation prohibition)) indicating prohibition of halfway participation in the group call. That is, the mobile station 10 receives the SMS information (SMS (notice of participation prohibition)) before receiving the INVITE (halfway participation).

Accordingly, useless transmission of the INVITE (halfway participation) in order to participate in the group call in which halfway participation is prohibited by another mobile station 10 can be prevented, and effective use of network resource can be attained.

Other Embodiments

While the present invention has been described with the above-mentioned embodiments, it is to be understood that the statements and drawings that make a part of this disclosure will not limit the present invention. From this disclosure, various alternative embodiments, examples, and technique for implementation will be apparent to persons skilled in the art.

For example, in description of the first embodiment mentioned above, the SMS server 100 and the SIP server 200 are different servers from each other, but not limited to this. Specifically, one network server connected to both the line switching NW 300 and the packet switching NW 400 may have function of the SMS server 100 and function of the SIP server 200.

In the first embodiment mentioned above, the servers provided in the communication system are the SMS server 100 and the SIP server 200, but not limited to this. Specifically, in addition to the SMS server 100 and the SIP server 200, the communication system may have a group call managing server that manages the group call. In this case, the group call management DB 203 provided in the SIP server 200 may be provided in the group call managing server.

Furthermore, in the first embodiment mentioned above, the mobile station 10 is informed of the group ID by the address registration request (SMS (registration request)) that requests address registration in the SIP server 200, but not limited to this.

Specifically, the mobile station 10 may be informed of the group ID by the SMS information transmitted through the line switching NW 300, after the group call is started. Alternatively, the mobile station 10 may be informed of the group ID by the SIP information (for example, INVITE) transmitted through the packet switching NW 400. Furthermore, in the fourth embodiment mentioned above, the mobile station 10a (originating mobile station) that requests start of the group call transmits the SIP information (INFO (notice of participation prohibition)) indicating prohibition of halfway participation in the group call, but not limited to this. Specifically, other mobile station 10 that participates in the group call may transmit the SIP information (INFO (notice of participation prohibition)).

Whole contents of Japanese Patent Application No. 2006-124525 (filed Apr. 27, 2006); Japanese Patent Application No. 2006-124526 (filed Apr. 7, 2006); Japanese Patent Application No. 2006-124528 (filed Apr. 27, 2006); and Japanese Patent Application No. 2006-124529 (filed Apr. 27, 2006) are incorporated herein by reference.

INDUSTRIAL APPLICABILITY

As mentioned above, the group call system, the mobile phone terminal, and the server according to the present invention allow easy halfway participation in a desired group call without invitation from a mobile phone terminal included the group that is performing a group call, and therefore, are useful in radio communications such as mobile communications.

The group call system, the mobile phone terminal, and the server according to the present invention notify reception of the group call through the line switching network having a cover area wider than that of the packet switching network. Thereby, the group call system, the mobile phone terminal, and the server according to the present invention allow participation in the group call by use of the received call history after entering within the packet switching network. Thus, the group call system, the mobile phone terminal, and the server according to the present invention can increase opportunities to participate in the group call, and accordingly, are useful in radio communications such as the mobile communications.

The invention claimed is:

1. A mobile phone terminal connectable with a group call system that performs a group call in which a phone call among a plurality of mobile phone terminals is performed, the mobile phone terminal comprising:
a receiver that receives, through a line switching network, an address registration request message including group call identification information identifying the group call and requesting address registration in a server provided in a packet switching network;
a storage unit that stores the group call identification information included in the address registration request message received through the line switching network, as a received call history; and
a processor that accepts calling operation for the group call corresponding to the group call identification information stored as the received call history, wherein
the processor acquires from the storage unit the group call identification information associated with the group call for which the calling operation has been accepted,
the processor transmits halfway participation calling information including the acquired group call identification information, and
the mobile phone terminal joining the group call halfway does not correspond to an initial formation of the group call.

2. The mobile phone terminal according to claim 1, wherein the group call identification information is a list of terminal identification information that identifies a mobile phone terminal specified as a member of the group call by the mobile phone terminal of a calling source of the group call.

3. The mobile phone terminal according to claim 1, wherein the group call identification information is a list of a telephone number of the mobile phone terminal specified as the member of the group call by the calling source of the group call.

4. The mobile phone terminal according to claim 1, wherein the group call identification information is a group ID uniquely assigned to the group call by the server.

5. A server provided in a packet switching network and that manages a group call in which a phone call among a plurality of mobile phone terminals is performed, the server comprising:
a new calling information receiver that receives new calling information that requests start of the group call;
a management unit that manages the group call on the basis of group call identification information that identifies the group call associated with the new calling information received in the new calling information receiver;
an instructing unit that instructs to include the group call identification information in an address registration request message to be transmitted to a calling destination mobile phone terminal of the group call through a line switching network, the calling destination mobile phone terminal of the group call associated with the new calling information received in the new calling information receiver;
a halfway participation calling information receiver that receives halfway participation calling information including the group call identification information; and
a halfway participation processor that determines whether or not an on-going group call exists in a plurality of group calls managed in the management unit, the on-going group call associated with the group call identification information included in the halfway participation calling information received in the halfway participation calling information receiver; and that permits the mobile phone terminal that has transmitted the halfway participation calling information to participate in the on-going group call when the on-going group call associated with the group call identification information exists,
wherein the mobile phone terminal joining the group call halfway does not correspond to an initial formation of the group call.

6. The server according to claim 5, wherein the group call identification information is a list of terminal identification information that identifies a mobile phone terminal specified as a member of the group call by a mobile phone terminal of a calling source of the group call.

7. The server according to claim 5, wherein the group call identification information is a list of a telephone number of the mobile phone terminal specified as the member of the group call by the calling source of the group call.

8. The server according to claim 5, wherein the group call identification information is a group ID that uniquely identifies the group call.

9. A mobile phone terminal connectable with a group call system that performs a group call in which a phone call among a plurality of mobile phone terminals is performed, the mobile phone terminal comprising:
   a receiver that receives new received call information requesting participation in the group call and including the group ID that uniquely identifies the group call;
   a storage unit that associates the group call corresponding to the new received call information received in the receiver, with the group ID included in the new received call information;
   and that stores the group call and the group ID as a received call history;
   a processor that accepts calling operation for the group call stored as the received call history, wherein
   the processor acquires from the storage unit the group ID associated with the group call for which the calling operation has been accepted,
   the processor transmits halfway participation calling information including the acquired group ID,
   the processor prohibits transmission of the halfway participation calling information associated with the group call after receiving a notice of a completion of the group call associated with the halfway participation calling information, when receiving the notice as a result of transmitting the halfway participation calling information, and
   the mobile phone terminal joining the group call halfway does not correspond to an initial formation of the group call.

10. The mobile phone terminal according to claim 9, wherein
   the storage unit stores a plurality of pieces of terminal identification information in association with the group ID, the pieces of terminal identification information respectively identifying a plurality of mobile phone terminals specified as a member of the group call stored as the received call history, and
   the mobile phone terminal further comprises a new calling information transmitter that transmits new calling information that requests start of a new group call when the re-calling prohibition unit prohibits transmission of the halfway participation calling information, the new calling information including the plurality of pieces of terminal identification information stored in the storage unit in association with the group ID.

11. The mobile phone terminal according to claim 10, further comprising a selector that selects the terminal identification information from the plurality of pieces of terminal identification information stored in the storage unit in association with the group ID, wherein
   the new calling information transmitter transmits the new calling information including the terminal identification information selected by the selector.

12. A group call system configured of a plurality of mobile phone terminals and a server that manages a group call in which a phone call among the mobile phone terminals is performed, wherein the server comprises:
   a new calling information receiver that receives new calling information that requests start of the group call;
   a management unit that assigns a group ID that uniquely specifies the group call associated with the new calling information received in the new calling information receiver, and that manages the group call on the basis of the group ID; and
   a transmitter that transmits the group ID assigned to the group call and new received call information that requests participation in the group call, to the mobile phone terminal of a calling destination of the group call associated with the new calling information received in the new calling information receiver,
the mobile phone terminal comprises:
   a storage unit that stores the group call as a received call history in association with the group ID included in the new received call information, the group call associated with the new received call information received from the server; and
   a processor that accepts calling operation for the group call stored as the received call history, wherein the processor acquires from the storage unit the group ID associated with the group call for which the calling operation has been accepted, and the processor transmits halfway participation calling information including the acquired group ID to the server, and
the server further comprises
   a halfway participation processor that determines whether or not an on-going group call associated with the group ID included in the halfway participation calling information received from the mobile phone terminal exists in the plurality of group calls managed in the management unit, and that permits the mobile phone terminal that has transmitted the halfway participation calling information to participate in the group call when the on-going group call associated with the group ID exists,
wherein the mobile phone terminal joining the group call halfway does not correspond to an initial formation of the group call.

13. A mobile phone terminal connectable with a group call system that performs a group call in which a phone call among a plurality of mobile phone terminals is performed, the mobile phone terminal comprising:
   a receiver that receives new received call information requesting participation in the group call and including a group ID that uniquely identifies the group call;
   a storage unit that associates the group call corresponding to the new received call information received from a server, with the group ID included in the new received call information;
   and that stores the group call and the group ID as a received call history; and
   a processor that accepts calling operation for the group call stored as the received call history, wherein
   the processor acquires from the storage unit the group ID associated with the group call for which the calling operation has been accepted,
   the processor transmits halfway participation calling information including the acquired group ID, and
   the mobile phone terminal joining the group call halfway does not correspond to an initial formation of the group call.

14. A server configured to manage a group call in which a phone call among a plurality of mobile phone terminals is performed, the server comprising:
- a new calling information receiver that receives new calling information that requests start of the group call;
- a management unit that assigns a group ID that uniquely identifies the group call associated with the new calling information received in the new calling information receiver, and that manages the group call on the basis of the group ID;
- a transmitter that transmits the group ID assigned to the group call to the mobile phone terminal of a calling destination of the group call associated with the new calling information received in the new calling information receiver, in addition to new received call information that requests participation in the group call;
- a halfway participation calling information receiver that receives halfway participation calling information including the group ID; and
- a halfway participation processor that determines whether or not an on-going group call associated with the group ID included in the halfway participation calling information received in the halfway participation calling information receiver exists in the plurality of group calls managed in the management unit, and that permits the mobile phone terminal that has transmitted the halfway participation calling information to participate in the on-going group call when the on-going group call associated with the group ID exists, wherein the mobile phone terminal joining the group call halfway does not correspond to an initial formation of the group call.

15. A server that manages a group call in which a phone call among a plurality of mobile phone terminals is performed, the server comprising:
- a new calling information receiver that receives new calling information that requests start of the group call;
- a management unit that manages whether or not a mobile phone terminal specified as a calling destination of the group call corresponding to the new calling information received in the new calling information receiver participates in the group call; and
- an informing unit that monitors a group call protocol application that executes the group call;

and that informs the mobile phone terminal specified as the calling destination of the group call and not participating in the group call, about a change of the group call protocol application, when the group call protocol application that executes the group call is changed, wherein the mobile phone terminal joining the group call halfway does not correspond to an initial formation of the group call.

16. A mobile phone terminal connectable with a group call system that performs a group call in which a phone call among a plurality of mobile phone terminals is performed, the mobile phone terminal comprising:
- a receiver that receives new received call information that requests participation in the group call, the new received call information including group identification information that identifies the group call;
- a storage unit that stores the group call corresponding to the new received call information received in the receiver, as a received call history, while associating the group call with the group identification information included in the new received call information and with application identification information identifying a group call protocol application that executes the group call;
- a received call history updating unit that updates the application identification information stored as the received call history on the basis of a notice of change of the group call protocol application when receiving the notice of change of the group call protocol application that executes the group call; and
- a processor that accepts calling operation for the group call stored as the received call history, wherein the processor acquires from the storage unit the application identification information and the group identification information associated with the group call for which the calling operation has been accepted, the processor transmits halfway participation calling information that includes the acquired group identification information and requests halfway participation in the group call with the group call protocol application associated with the acquired application identification information, and the mobile phone terminal joining the group call halfway does not correspond to an initial formation of the group call.

* * * * *